US011953899B2

(12) United States Patent
Taguchi et al.

(10) Patent No.: US 11,953,899 B2
(45) Date of Patent: *Apr. 9, 2024

(54) REMOTE MONITORING SYSTEM AND AN AUTONOMOUS RUNNING VEHICLE AND REMOTE MONITORING METHOD

(71) Applicant: TOYOTA JIDOSHA KABUSHIKI KAISHA, Toyota (JP)

(72) Inventors: Koji Taguchi, Sagamihara (JP); Makoto Morita, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,077

(22) Filed: Oct. 14, 2022

(65) Prior Publication Data

US 2023/0202526 A1 Jun. 29, 2023

Related U.S. Application Data

(63) Continuation of application No. 17/965,328, filed on Oct. 13, 2022, which is a continuation of application
(Continued)

(30) Foreign Application Priority Data

Nov. 7, 2017 (JP) .................... 2017-214690

(51) Int. Cl.
*B60W 60/00* (2020.01)
*B60W 30/09* (2012.01)
(Continued)

(52) U.S. Cl.
CPC ........... *G05D 1/0038* (2013.01); *B60W 30/09* (2013.01); *B60W 30/0956* (2013.01);
(Continued)

(58) Field of Classification Search
CPC .......... B60W 2420/42; G06K 9/00805; G07C 5/008; G06V 20/58
See application file for complete search history.

(56) References Cited

U.S. PATENT DOCUMENTS 6,321,147 B1   11/2001   Takeda et al.
9,547,307 B1   1/2017   Cullinane et al.
(Continued)

FOREIGN PATENT DOCUMENTS

JP   6-61045 B2   8/1994
JP   8-19 A       1/1996
(Continued)

OTHER PUBLICATIONS

Advisory Action dated Jan. 4, 2022 issued in U.S. Appl. No. 16/180,092.
(Continued)

*Primary Examiner* — Peter D Nolan
*Assistant Examiner* — Ce Li Li
(74) *Attorney, Agent, or Firm* — Sughrue Mion, PLLC

(57) ABSTRACT

An autonomous running vehicle transmits a camera image around the vehicle photographed by a camera to a remote monitoring center. An obstacle is detected on the basis of information obtained from autonomous sensors including the camera. When an obstacle is detected, the autonomous running vehicle is automatically stopped. The remote monitoring center determines, when the autonomous running vehicle automatically stops, whether or not the run of the autonomous running vehicle is permitted to restart on the basis of the received camera video. When it is determined that the autonomous running vehicle can be restarted, a departure signal is transmitted to the autonomous running
(Continued)

vehicle. When the departure signal is received from the remote monitoring center, the autonomous running vehicle restarts running.

19 Claims, 13 Drawing Sheets

Related U.S. Application Data

No. 17/964,476, filed on Oct. 12, 2022, which is a continuation of application No. 17/963,680, filed on Oct. 11, 2022, which is a continuation of application No. 17/360,830, filed on Jun. 28, 2021, which is a continuation of application No. 16/180,092, filed on Nov. 5, 2018, now Pat. No. 11,513,516.

(51) Int. Cl.
| | | |
|---|---|---|
| *B60W 30/095* | (2012.01) | |
| *G05D 1/00* | (2006.01) | |
| *G06V 20/58* | (2022.01) | |
| *G07C 5/00* | (2006.01) | |

(52) U.S. Cl.
CPC ....... *B60W 60/0018* (2020.02); *G05D 1/0022* (2013.01); *G05D 1/0088* (2013.01); *G05D 1/0246* (2013.01); *G06V 20/58* (2022.01); *B60W 2420/42* (2013.01); *B60W 2554/40* (2020.02); *B60W 2556/45* (2020.02); *G05D 2201/0213* (2013.01); *G07C 5/008* (2013.01)

(56) References Cited

U.S. PATENT DOCUMENTS

| | | | | |
|---|---|---|---|---|
| 2002/0074959 | A1* | 6/2002 | Van Wiemeersch | E05F 15/43 |
| | | | | 318/445 |
| 2008/0133103 | A1 | 6/2008 | Meske et al. | |
| 2008/0266052 | A1 | 10/2008 | Schmid | |
| 2010/0152963 | A1 | 6/2010 | Heckel et al. | |
| 2018/0032081 | A1* | 2/2018 | Etoh | G05D 1/0255 |
| 2018/0037262 | A1* | 2/2018 | Imai | G08G 1/0962 |
| 2018/0194344 | A1* | 7/2018 | Wang | G05D 1/0088 |
| 2019/0082314 | A1* | 3/2019 | Yukizaki | H04W 28/0226 |
| 2019/0137999 | A1 | 5/2019 | Taguchi | |
| 2019/0317491 | A1* | 10/2019 | Kobayashi | G07C 5/008 |
| 2019/0339692 | A1* | 11/2019 | Sakai | G05D 1/0027 |
| 2019/0361436 | A1* | 11/2019 | Ueda | G08G 1/09 |
| 2021/0325871 | A1 | 10/2021 | Taguchi et al. | |

FOREIGN PATENT DOCUMENTS

| | | | |
|---|---|---|---|
| JP | 11-149315 | A | 6/1999 |
| JP | 2000-330636 | A | 11/2000 |
| JP | 2002-41145 | A | 2/2002 |
| JP | 2003-316438 | A | 11/2003 |
| JP | 2005-112011 | A | 4/2005 |
| JP | 2016-181031 | A | 10/2016 |
| JP | 2016-181032 | A | 10/2016 |
| JP | 2016-185745 | A | 10/2016 |
| JP | 2016-215751 | A | 12/2016 |
| JP | 2017-92678 | A | 5/2017 |

OTHER PUBLICATIONS

Koji Taguchi, et al., U.S. Appl. No. 16/180,092, filed Nov. 5, 2018.
Koji Taguchi, et al., U.S. Appl. No. 17/963,680, filed Oct. 11, 2022.
Koji Taguchi, et al., U.S. Appl. No. 17/964,476, filed Oct. 12, 2022.
Koji Taguchi, et al., U.S. Appl. No. 17/965,328, filed Oct. 13, 2022.
Notice of Allowance dated Sep. 1, 2022 issued in U.S. Appl. No. 16/180,092.
Office Action dated Feb. 18, 2022 in U.S. Appl. No. 16/180,092.
Office Action dated Sep. 21, 2021 issued in U.S. Appl. No. 16/180,092.
Office Action dated Jun. 23, 2022 in U.S. Appl. No. 16/180,092.
Wu Bin, "Age of Intelligence: Bridge and Road of Media Convergence", Dec. 2016, pp. 240-241 (5 pages total).
Office Action dated Mar. 27, 2023 issued in U.S. Appl. No. 17/963,680.
Office Action dated Jun. 11, 2021 in U.S. Appl. No. 16/180,092.
Office Action dated Dec. 23, 2022 issued in U.S. Appl. No. 17/360,830.
Notice of Allowance dated Jul. 17, 2023 in U.S. Appl. No. 17/963,680.
Office Action dated Jun. 20, 2023 issued in U.S. Appl. No. 17/965,328.
Office Action dated Sep. 18, 2023 in U.S. Appl. No. 17/964,476.
Office Action dated Nov. 27, 2023 in U.S. Appl. No. 17/360,830.
Office Action dated Jan. 22, 2024 in U.S. Appl. No. 17/965,328.

* cited by examiner

REMOTE MONITORING SYSTEM AND AN AUTONOMOUS RUNNING VEHICLE AND REMOTE MONITORING METHOD

CROSS-REFERENCE TO RELATED APPLICATION

The present application is a continuation of U.S. application Ser. No. 17/965,328, filed Oct. 13, 2022, which is a continuation of U.S. application Ser. No. 17/964,476, filed Oct. 12, 2022, which is a continuation of U.S. application Ser. No. 17/963,680, filed Oct. 11, 2022, which is a continuation of U.S. application Ser. No. 17/360,830, filed Jun. 28, 2021, which is a continuation of U.S. application Ser. No. 16/180,092, filed Nov. 5, 2018, which claims priority under 35 U.S.C. § 119 to Japanese Patent Application No. 2017-214690, filed Nov. 7, 2017. The entire disclosures of the prior applications are considered part of the disclosure of the accompanying continuation application, and are hereby incorporated by reference.

FIELD

Embodiments of the present application relates to the remote monitoring technology that remoteness monitors an autonomous running vehicle.

BACKGROUND

A patent document U.S. Pat. No. 9,547,307(B1) discloses a system which an autonomous running vehicle and a server were connected to through a network.

SUMMARY

Generally, the autonomous running vehicle includes a function to detect an obstacle by an autonomous sensor including the camera. However, detective performance of the autonomous sensor is not necessarily sufficient.

Thus, as one method to ensure the safety during autonomous running, a method in which an image of the on-vehicle camera is sent to a remote monitoring center and a vehicle is remotely monitored by the remote monitoring center is proposed. However, it is difficult to constantly and remotely monitor the vehicle on interruption rate of present communication.

The preferred embodiments have been devised in view of the problem described above, and an object of the preferred embodiments is to provide a remote monitoring technology that can ensure the safety during autonomous running of the autonomous running vehicle.

A remote monitoring system according to the preferred embodiments comprises an autonomous running vehicle and a remote monitoring center which communicates with the autonomous running vehicle through a network.

The autonomous running vehicle comprises autonomous sensor, a camera image transmitter section, an obstacle detection part, a stop control unit and a restart control unit. The autonomous sensor is a sensor for recognizing a peripheral environment of the autonomous running vehicle and at least includes a camera. The camera image transmitter section is configured to transmit an image around the autonomous running vehicle photographed by the camera to the remote monitoring center. The obstacle detection part is configured to detect an obstacle relating to the autonomous running vehicle based on information obtained by the autonomous sensor. The stop control unit is configured to automatically stop the autonomous running vehicle when an obstacle is detected by the obstacle detection part. The restart control unit is configured to restart a run of the autonomous running vehicle when a departure signal from the remote monitoring center is received after automatic stop of the autonomous running vehicle by the stop control unit.

The remote monitoring center is configured to determine whether or not the run of the autonomous running vehicle is restarted based on a camera image from the camera image transmitter section when the autonomous running vehicle automatically stopped. Also, the remote monitoring center is configured to transmit a departure signal to the autonomous running vehicle when determining that the run of the autonomous running vehicle may be permitted to restart.

The remote monitoring system according to the preferred embodiments is configured as described above, thereby the autonomous running vehicle is automatically stopped when the obstacle is detected by the autonomous sensor. If safety is confirmed with the camera image of the autonomous running vehicle by a remote monitoring center, a departure signal is sent to the autonomous running vehicle from the remote monitoring center, and the autonomous running vehicle is restarted. Thus, it can ensure safety during autonomous run of the autonomous running vehicle, especially safety at the time of restarting after the automatic stop, by performing duplex monitoring with the autonomy detection of the obstacle by the autonomous sensor of the autonomous running vehicle and with the remote monitoring by the remote monitoring center.

The stop control unit may be configured to, when an obstacle is detected by the obstacle detection part, run the autonomous running vehicle at reduced speed and, when the communication with the remote monitoring center is interrupted, automatically stop the autonomous running vehicle. Thereby, during the communication being established between the autonomous running vehicle and the remote monitoring center, the uncomfortable feeling of occupants can be suppressed while improving a detection rate of the autonomous sensor by the run at reduced speed. And safety can be secured by automatic stop of the autonomous running vehicle when the communication between the autonomous running vehicle and the remote monitoring center is interrupted.

The restart control unit may be configured to slow down the autonomous running vehicle for predetermined time after restarting the autonomous running vehicle. Safety can be secured after restarting by the run at reduced speed for the predetermined time.

The restart control unit may be configured to run the autonomous running vehicle at reduced speed while the departure signal is received from the remote monitoring center and to stop the autonomous running vehicle when the departure signal from the remote monitoring center is interrupted. Because, if the departure signal from the remote monitoring center stops, the autonomous running vehicle stops, the safety in a state where the remote surveillance by the remote monitoring center does not function can be secured. There is also an effect that the autonomous running vehicle can be immediately stopped by the stop of the departure signal from the remote monitoring center.

The restart control unit may be configured to restart the autonomous running vehicle autonomously, when the obstacle is not detected by the obstacle detection part after automatic stop of the autonomous running vehicle by the stop control unit. Thereby, when safety is confirmed on side of the autonomous running vehicle even if the communication between the autonomous running vehicle and the remote monitoring center is interrupted, the autonomous running vehicle can be restarted.

The obstacle detection part may be configured to, when the communication with the remote monitoring center is interrupted, change a threshold value of obstacle detection so as to reduce non-detection whereas permitting erroneous detection compared with the case that the communication with the remote monitoring center is established. Thereby, when the communication between the autonomous running vehicle and the remote monitoring center is interrupted, the erroneous detection (that is, the state wherein an obstacle which there cannot be is detected by mistake) will increase but the non-detection (that is, the state wherein an obstacle which there should be is not detected) can be reduced by changing the threshold value of the obstacle detection. As a result, it can ensure the safety in a situation wherein the remote surveillance by the remote monitoring center does not function.

The remote monitoring center may be configured to, when the autonomous running vehicle approaches place of which safety is confirmed with the remote monitoring center, notify the autonomous running vehicle of the safety of the place. The stop control unit may be further configured to, when the obstacle detection part detects an obstacle in the place of which safety is notified from the remote monitoring center, determine that the detection of the obstacle is erroneous detection and prevent the autonomous running vehicle from being stopped. Thereby, the frequency of inessential stop of the autonomous running vehicle due to the erroneous detection of the obstacle can be reduced.

An autonomous running vehicle according to the preferred embodiments is connected to a remote monitoring center through a network and can be remotely operated by a remote monitoring center. The autonomous running vehicle comprises an autonomous sensor, a camera image transmitter section, an obstacle detection part, a stop control unit and a restart control unit. The autonomous sensor is a sensor for recognizing a peripheral environment of the autonomous running vehicle and at least includes a camera. The camera image transmitter section is configured to transmit an image around the autonomous running vehicle photographed by the camera to the remote monitoring center. The obstacle detection part is configured to detect an obstacle relating to the autonomous running vehicle based on information obtained by the autonomous sensor. The stop control unit is configured to automatically stop the autonomous running vehicle when an obstacle is detected by the obstacle detection part. The restart control unit is configured to restart a run of the autonomous running vehicle when a departure signal from the remote monitoring center is received after automatic stop of the autonomous running vehicle by the stop control unit.

Thus, it can ensure safety during autonomous run of the autonomous running vehicle, especially safety at the time of restarting after the automatic stop, by performing duplex monitoring with the autonomy detection of the obstacle by the autonomous sensor of the autonomous running vehicle and with the remote monitoring by the remote monitoring center.

A remote monitoring method according to the preferred embodiments is a remote monitoring method performed in a remote monitoring system comprising an autonomous running vehicle and a remote monitoring center communicating with the autonomous running vehicle through a network.

The remote monitoring method includes;
step to transmit an image around the autonomous running vehicle photographed by a camera to the remote monitoring center from the autonomous running vehicle;
step to autonomously detect an obstacle relating to the autonomous running vehicle based on information obtained by an autonomous sensor including at least a camera;
step to automatically stop the autonomous running vehicle when an obstacle is detected by autonomous detection of the autonomous running vehicle;
step in the remote monitoring center to determine, based on a camera image from the autonomous running vehicle, whether or not the run of the autonomous running vehicle is restarted when the autonomous running vehicle automatically stopped;
step to, when the remote monitoring center determines that the run of the autonomous running vehicle may be restarted, send to the autonomous running vehicle a departure signal for permitting the autonomous running vehicle to restart; and
step to restart a run of the autonomous running vehicle when the departure signal from the remote monitoring center is received.

According to the remote monitoring method including the above-mentioned steps, it can ensure safety during autonomous run of the autonomous running vehicle, especially safety at the time of restarting after the automatic stop, by performing duplex monitoring with the autonomy detection of the obstacle by the autonomous sensor of the autonomous running vehicle and with the remote monitoring by the remote monitoring center.

In the step to automatically stop the autonomous running vehicle, when an obstacle is detected by autonomy detection of the autonomous running vehicle, the autonomous running vehicle may run at reduced speed, and the autonomous running vehicle may automatically stop when the communication between the autonomous running vehicle and the remote monitoring center is interrupted. Thereby, during the communication being established between the autonomous running vehicle and the remote monitoring center, the uncomfortable feeling of occupants can be suppressed while improving a detection rate of the autonomous sensor by the run at reduced speed. And, safety can be secured by automatic stop of the autonomous running vehicle when the communication between the autonomous running vehicle and the remote monitoring center is interrupted.

In the step to restart the run of the autonomous running vehicle, the autonomous running vehicle may run at reduced speed for predetermined time after restarting the autonomous running vehicle. Thereby, it can ensure the safety after the autonomous running vehicle restarts.

In the step to restart the run of the autonomous running vehicle, the autonomous running vehicle may run at reduced speed only while the departure signal from the remote monitoring center is received whereas may stop when the departure signal from the remote monitoring center is interrupted. Because, if the departure signal from the remote monitoring center is interrupted, the autonomous running vehicle stops, the safety in a state where the remote surveillance by the remote monitoring center does not function can be secured. There is also an effect that the autonomous running vehicle can be immediately stopped by the stop of the departure signal from the remote monitoring center.

In the step to restart the run of the autonomous running vehicle, when an obstacle is not detected by autonomy detection of the autonomous running vehicle after automatic stop of the autonomous running vehicle, the autonomous running vehicle may autonomously restart a run. Thereby, when safety is confirmed on side of the autonomous running vehicle even if the communication between the autonomous running vehicle and the remote monitoring center is interrupted, the autonomous running vehicle can be restarted.

The remote monitoring method according to the preferred embodiments may further include step to, when the communication with the remote monitoring center is interrupted, change a threshold value of obstacle detection so as to reduce non-detection whereas permitting erroneous detection compared with the case that the communication with the remote monitoring center is established. The erroneous detection will increase but non-detection can be reduced by changing the threshold value of obstacle detection when the communication between the autonomous running vehicle and the remote monitoring center is interrupted. Therefore, it can ensure the safety in the situation where the remote surveillance by the remote monitoring center does not function.

The remote monitoring method may further comprise step to notify the autonomous running vehicle of the safety of the place when the autonomous running vehicle approaches place of which safety is confirmed with the remote monitoring center. In this case, the autonomous running vehicle may not stop even if an obstacle is detected by autonomy detection of the autonomous running vehicle in the place of which safety is notified from the remote monitoring center. Thereby, the frequency of inessential stop of the autonomous running vehicle due to the erroneous detection of the obstacle can be reduced.

According to the remote monitoring system, the autonomous running vehicle and the remote monitoring method of the preferred embodiments, it can ensure safety during autonomous run of the autonomous running vehicle, especially safety at the time of the restarting after the automatic stop, by performing duplex monitoring with the autonomy detection of the obstacle by the autonomous sensor of the autonomous running vehicle and with the remote monitoring by the remote monitoring center.

DESCRIPTION OF EMBODIMENTS

First Embodiment

1. Configuration of Remote Monitoring System

Figure 1:
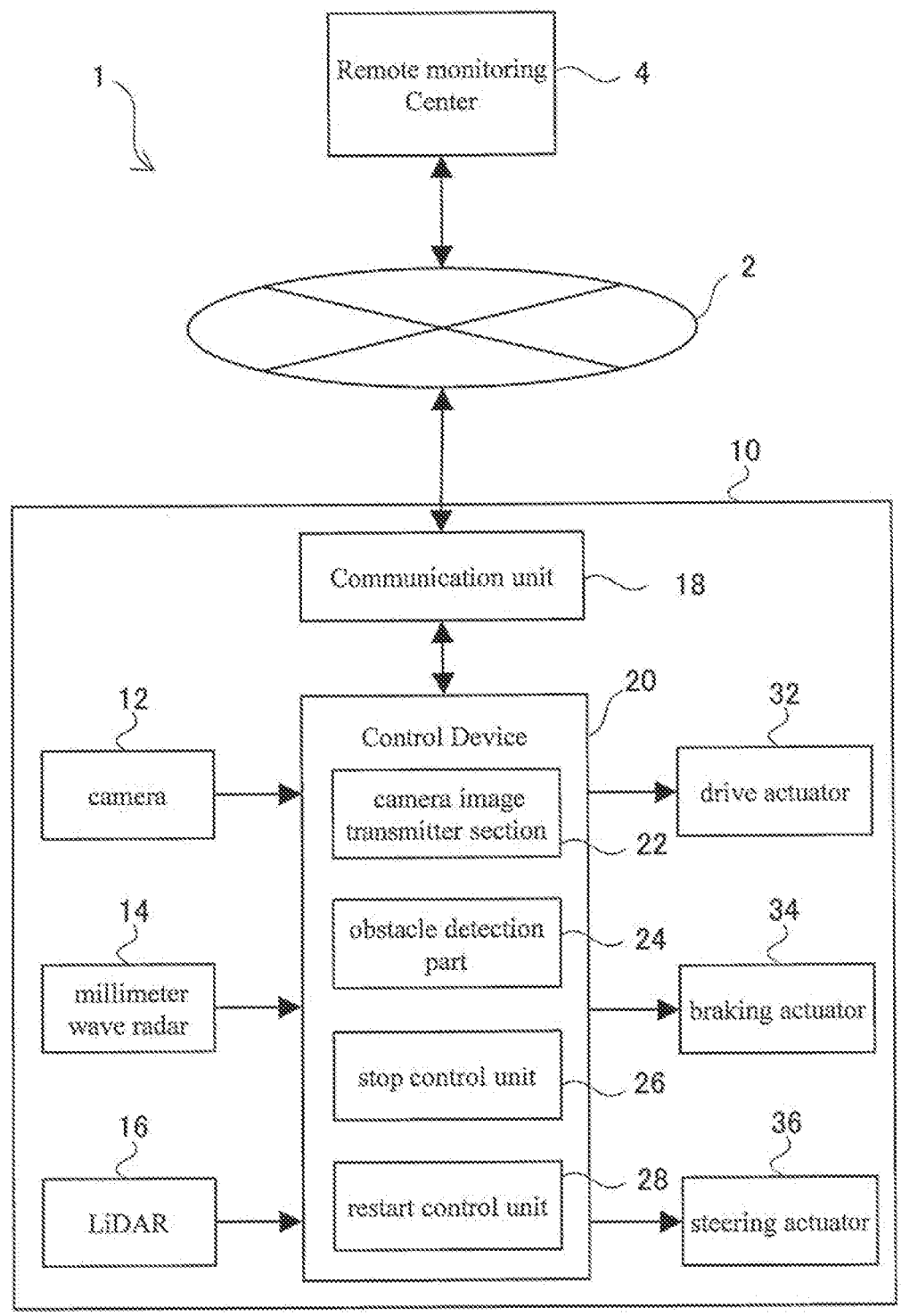
FIG. 1 is a view which shows a configuration of a remote monitoring system according to the preferred embodiments.

A remote monitoring system is a system in which an autonomous running vehicle and a remote monitoring center are connected to by network. FIG. 1 is a view which shows configuration of the remote monitoring system 1 according to the preferred embodiments. The configuration of the remote monitoring system 1 is described with reference to FIG. 1 as follows. Note that configuration of the remote monitoring system 1 described herein is the configuration to be also common to the 2nd to 7th embodiments described below as well as 1st embodiment.

The remote monitoring system 1 includes the vehicle 10 which is an autonomous running vehicle and the remote monitoring center 4 communicating with the vehicle 10 through a network 2 (i.e., uses the Internet). The vehicle 10 is remotely monitored by the remote monitoring center 4. The remote monitoring center 4 may remotely monitor one vehicle 10 by exclusive belonging, and may remotely monitor the several vehicles 10 at the same time.

Unmanned or manned do not matter to the remote monitoring center 4. In the remote monitoring center 4, the remote surveillance of the vehicle 10 may be carried out by a monitoring person, and the remote surveillance of vehicle 10 may be performed only by a computer. In case that the remote surveillance is carried out by a monitoring person, the remote monitoring center 4 is provided with at least a display for displaying a transmitted camera image and HMI (Human Machine Interface) by which a watchman indicates to a computer of the remote monitoring center 4. In case that the remote surveillance is performed only by a computer, the computer itself becomes the remote monitoring center 4.

An on-vehicle system of the vehicle 10 is shown in FIG. 1 by blocks. The vehicle 10 includes autonomous sensors 12, 14 and 16 to recognize peripheral environment. The autonomous sensors 12, 14 and 16 include a camera 12, a millimeter wave radar 14 and LiDAR (Light Detection and Ranging) 16. The camera 12 is required and the millimeter wave radar 14 and the LiDAR 16 may be omitted. For example, camera 12 is attached to a windshield of the vehicle 10 to photograph at least a front of a course of the vehicle 10. The acquired information by the autonomous sensors 12, 14 and 16 is sent to a control device 20 installed in the vehicle 10.

The control device 20 acquires various information for autonomous run including the information from the autonomous sensors 12, 14 and 16 and signals from the remote monitoring center 4 and operate actuators 32, 34 and 36 by operation signals which are obtained by processing the information and the signals from the remote monitoring center 4. At least a drive actuator 32 to drive the vehicle 10, a braking actuator 34 to brake the vehicle 10 and a steering actuator 36 to steer the vehicle 10 are included in the actuators 32, 34 and 36.

The various information for autonomous run includes information about state of the vehicle 10 acquired by vehicles sensors such as a vehicle speed sensor or an acceleration sensor not to illustrate, and the like. Furthermore, the various information for autonomous run includes location information acquired by a GPS receiver not to illustrate, which indicates the position of the vehicle 10, and map information included in a map database. The signals from the remote monitoring center 4 are acquired by radio communication with a communication unit 18 installed in the vehicle 10. A communication standard of the radio communication that the communication unit 18 uses should be a standard of mobile communication such as 4G, LTE or 5G, and the like.

Control device 20 is ECU (Electronic Control Unit) having at least one processor and at least one memory. At least one program and various data for autonomous run are stored in memory. The program stored in memory is read and performed with the processor so that various functions for autonomous run are realized in the control device 20.

The control device 20 calculates travel route making the vehicle 10 run based on the location information and the map information of the vehicle 10 and controls driving, steering and braking of the vehicle 10 so that the vehicle 10 runs along the calculated travel route. However, various methods to make the vehicle 10 autonomy run along travel route are known, and the method itself in the preferred embodiments is not limited. Thus, in the embodiments, the explanation on the method to make the vehicle 10 autonomy run along the travel route is omitted.

In FIG. 1, functions related to safety securing during autonomous running among functions of the control device 20 related to autonomous running are expressed by blocks. The illustration of other functions which the control device 20 has is omitted. The control device 20 has function to automatically stop when an obstacle having a risk of collision with the vehicle 10 is detected and to restart running when it is confirmed that there is no danger of the collision. This function is implemented by a camera image transmitter section 22, an obstacle detection part 24, a stop control unit 26 and a restart control unit 28 which the control device 20 includes. However, these do not exist as hardware in the control device 20 but they are implemented as with software when a program stored in the memory was executed by the processor.

The camera image transmitter section 22 transmits an image around the vehicle 10 photographed by the camera 12 to the remote monitoring center 4. The transmitted camera image includes at least an image of the front of the course of the vehicle 10. While the vehicle 10 is stopped by the stop control unit 26 described below, the camera image transmitter section 22 transmits camera image according to a communication cycle between the remote monitoring center 4 and the communication unit 18. The camera image transmitted to remote monitoring center 4 is used by remote surveillance around the vehicle 10. The communication cycle may be fixed or may be changed according to running environment of the vehicle 10. For example, the communication cycle in the lane for exclusive use of automobiles may be extended. Also, the communication cycle at the intersection with traffic lights may be shortened, and the communication cycle at the intersection without traffic light may be further shortened.

The obstacle detection part detects an obstacle relating to the vehicle 10 based on information obtained by the autonomous sensor 12 14 and 16. Particularly, the obstacle having a risk of collision with the vehicle 10 in the front of the course of vehicle 10 is detected. Various methods of detecting an obstacle based on sensor information including camera image are known, and the method itself is not limited in the preferred embodiments. For example, an obstacle may be detected only based on camera image with the camera 12. Also, an obstacle may be detected by the sensor fusion that combined a plurality of autonomous sensor 12, 14 and 16. The obstacle detection part 24 can change the threshold of the obstacle detection. The threshold of the obstacle detection is a threshold value for determining, when there are digital data with a possibility of an obstacle, whether or not it is considered as an obstacle (for example, it is considered as noise).

When an obstacle is detected by the obstacle detection part 24, the stop control unit 26 makes vehicle 10 automatically stopped. Specifically, the stop control unit 26 controls braking force acting on the vehicle 10 by the driving actuator 32 and braking actuator 34 so as to stop the vehicle 10 just before the obstacle. Also, the stop control unit 26 transmits a vehicle stop signal to the remote monitoring center 4 when automatically stopping the vehicle 10. At this time, from camera image transmitter section 22, camera image monitoring the periphery of the vehicle 10 photographed by the camera 12 is transmitted to the remote monitoring center 4.

When a departure signal from the remote monitoring center 4 is received after automatic stop of the vehicle 10 by the stop control unit 26, the restart control unit 28 restarts the running of the vehicle 10. More specifically, the restart control unit 28 makes the vehicle 10 go slowly for predetermined time after the restarting of the running in order to ensure safety. And, after lapse of the predetermined time, the restart control unit 28 makes the vehicle 10 accelerate along predetermined speed plan.

In the remote monitoring center 4, when the vehicle 10 automatically stops, determination is made as to whether or not the running of the vehicle 10 can be restarted based on the camera image from the camera image transmitter section 22. In case that the remote surveillance on the remote monitoring center 4 is performed by a computer, the computer, for example, determines whether or not an obstacle is photographed in the camera image transmitted from the vehicle 10 based on image data (big data). A judgment based on the image data can use an image processing technology using artificial intelligence. When an obstacle is detected in the camera image, the computer transmits a departure signal to the vehicle 10. A series of the processing from the reception of the camera image to the transmission of the departure signal can be performed by the computer without intervention of a human.

In case that the remote surveillance on the remote monitoring center 4 is performed by a monitoring person, the camera image transmitted from the vehicle 10 is displayed on a display. The monitoring person views the camera image to confirm the peripheral situation of the vehicle 10. When the monitoring person determined that the running of the vehicle 10 can be restarted as a result of confirmation of the camera image, the monitoring person operates HMI and indicates authorization for departure of the vehicle 10 to the computer of the remote monitoring center 4. The computer of the remote monitoring center 4 determines that the running of the vehicle 10 can be restarted by receiving the departure authorization and transmits a departure signal to the vehicle 10. In each remote monitoring method of the embodiments described below, it is supposed that the remote surveillance is carried out by the monitoring person.

Figure 2:
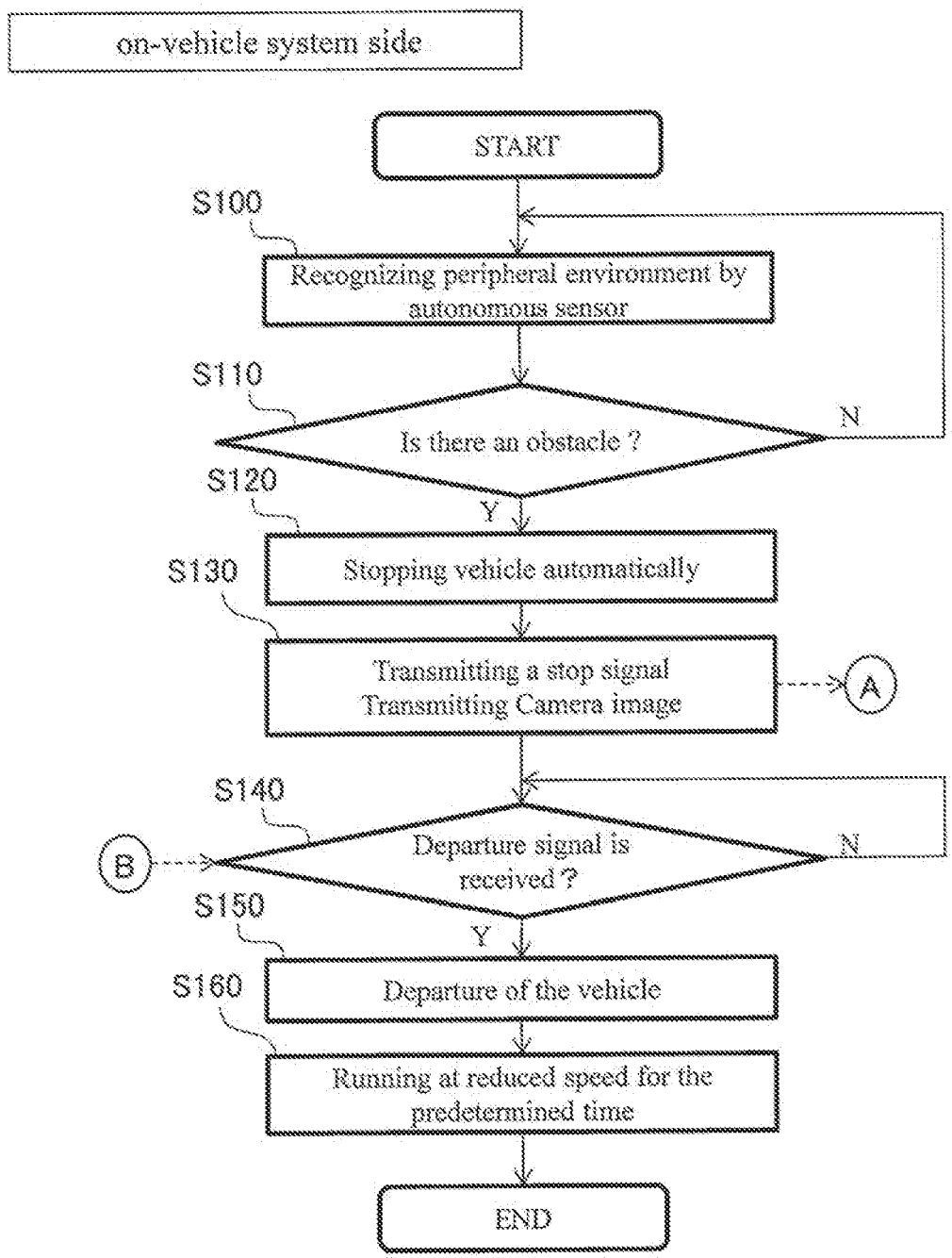
FIG. 2 is a flow chart which shows processing on on-vehicle system side for realizing remote monitoring method of 1st embodiment.
Figure 3:
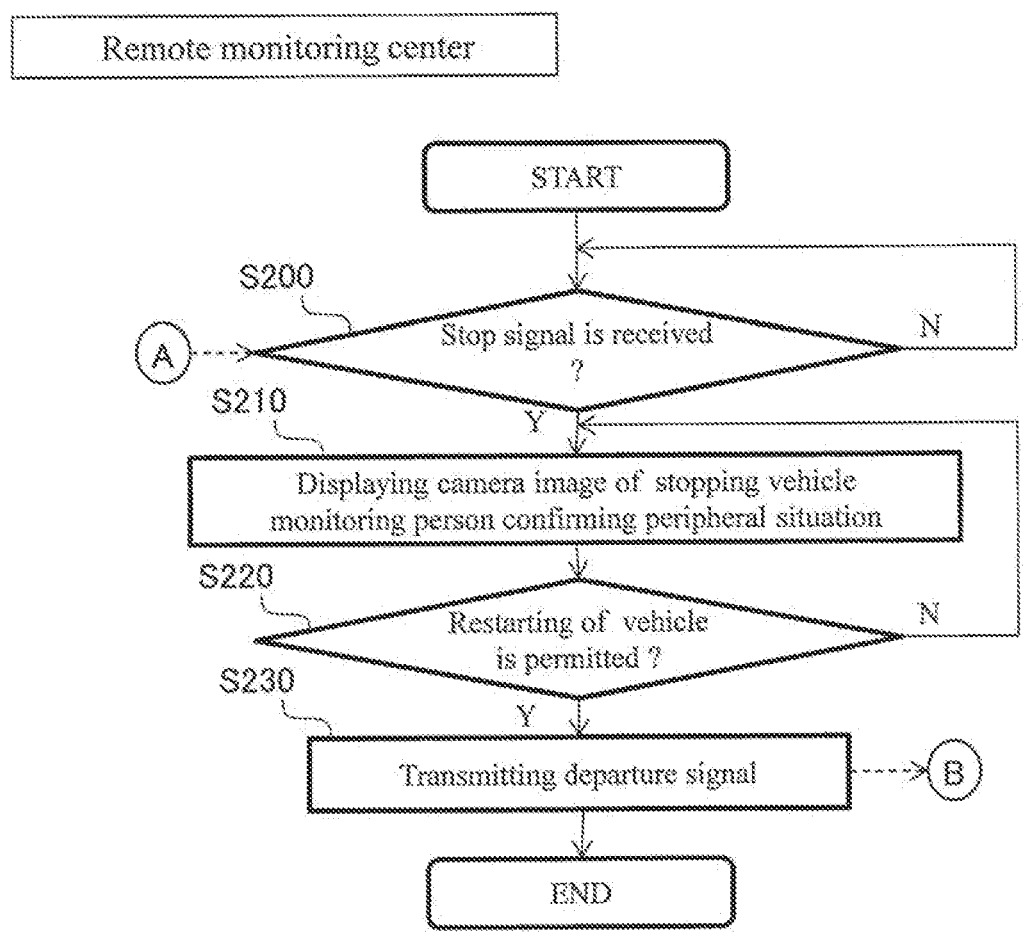
FIG. 3 is a flow chart which shows processing on remote monitoring center side for realizing the remote monitoring method of 1st embodiment.

Remote monitoring method according to 1st embodiment Remote monitoring method according to 1st embodiment which can be performed in the remote monitoring system 1 which has the above configurations will be described as follows:

The remote monitoring method by the remote monitoring system 1 can be separately described into processing of in-vehicle system side and processing of the remote monitoring center side. FIG. 2 is a flow chart which shows processing on the on-vehicle system side for realizing the remote monitoring method of 1st embodiment. FIG. 3 is a flow chart which shows processing on the remote monitoring center side for realizing remote monitoring method of 1st embodiment.

At first, the processing on the on-vehicle system side will be described with reference to FIG. 2. According to the flow chart shown in FIG. 2, peripheral environment is recognized by the autonomous sensor 12, 14 and 16 (step S100). The obstacle detection part 24 determines, based on the information obtained from the autonomous sensor 12, 14 and 16 in step S100, whether or not there is an obstacle having a risk of collision with the vehicle 10 (step S110). When such an obstacle is not detected, the processing of step S100 and the determination of step S110 are repeated.

When an obstacle having a risk of collision is detected in step S110, the stop control unit 26 stops the vehicle 10 automatically before the obstacle (step S120). The stop control unit 26 transmits a stop signal to the remote monitoring center 4. The camera image transmitter section 22 transmits camera image, which is an image around the vehicle 4 photographed by the camera 12, to remote monitoring center 4 (step S130).

After the stop signal was transmitted to the remote monitoring center 4, the restart control unit 28 determines whether or not a departure signal from the remote monitoring center 4 was received (step S140). The vehicle 10 has stopped until the departure signal is received. When receiving a departure signal from the remote monitoring center 4, the restart control unit 28 performs the processing for departure of the vehicle 10 (step S150), and makes the vehicle 10 run at reduced speed for the predetermined time after the departure (step S160).

The processing on the remote monitoring center side will be described with reference to FIG. 3. According to the flow chart shown in FIG. 3, the remote monitoring center 4 determines whether or not the stop signal from the vehicle 10 was received (step S200). The remote monitoring center 4 is in the standby state until the stop signal is received.

When receiving the stop signal from the vehicle 10, the camera image transmitted by the stopping vehicle is displayed on a display. The monitoring person views the camera image displayed on the display to confirm the peripheral situation of the vehicle 10 (step S210). Based on the confirmation result on the display, the monitoring person determines whether or not restarting of the vehicle 10 is permitted in the situation (step S220). In case that the restarting of the vehicle 10 cannot be permitted in the situation, the processing of step S210 and the determination of step S220 are repeated.

The situation in which restarting of the vehicle 10 is permitted is, for example, the case where a risk of collision goes away by movement of the obstacle or the case where the detection of the obstacle is confirmed to be a false detection. A case where the stop position of the vehicle 10 is before the crosswalk is taken for a specific example. In this case, when it is confirmed that the pedestrian which is the obstacle have surely finished crossing of the crosswalk, the running can be restarted. When the vehicle 10 is restarted, a departure signal is transmitted from the computer of the remote monitoring center 4 to the vehicle 10 according to an operation on the HMI by the monitoring person (step S230).

According to the remote monitoring method performed in the above-mentioned manner, it can ensure safety during autonomous running of the vehicle 10, especially safety at the time of restarting after the automatic stop, by performing duplex monitoring with the autonomy detection of an obstacle by the autonomous sensor 12, 14 and 16 of the vehicle 10 and with the remote monitoring by the remote monitoring center 4. Furthermore, according to the remote monitoring method of 1st embodiment, it can ensure the safety after the restarting of the vehicle 10 by running at reduced speed without increasing speed until the predetermined time elapses after the vehicle 10 is brought in the situation in which the vehicle 10 can be restarted.

2nd Embodiment

Figure 4:
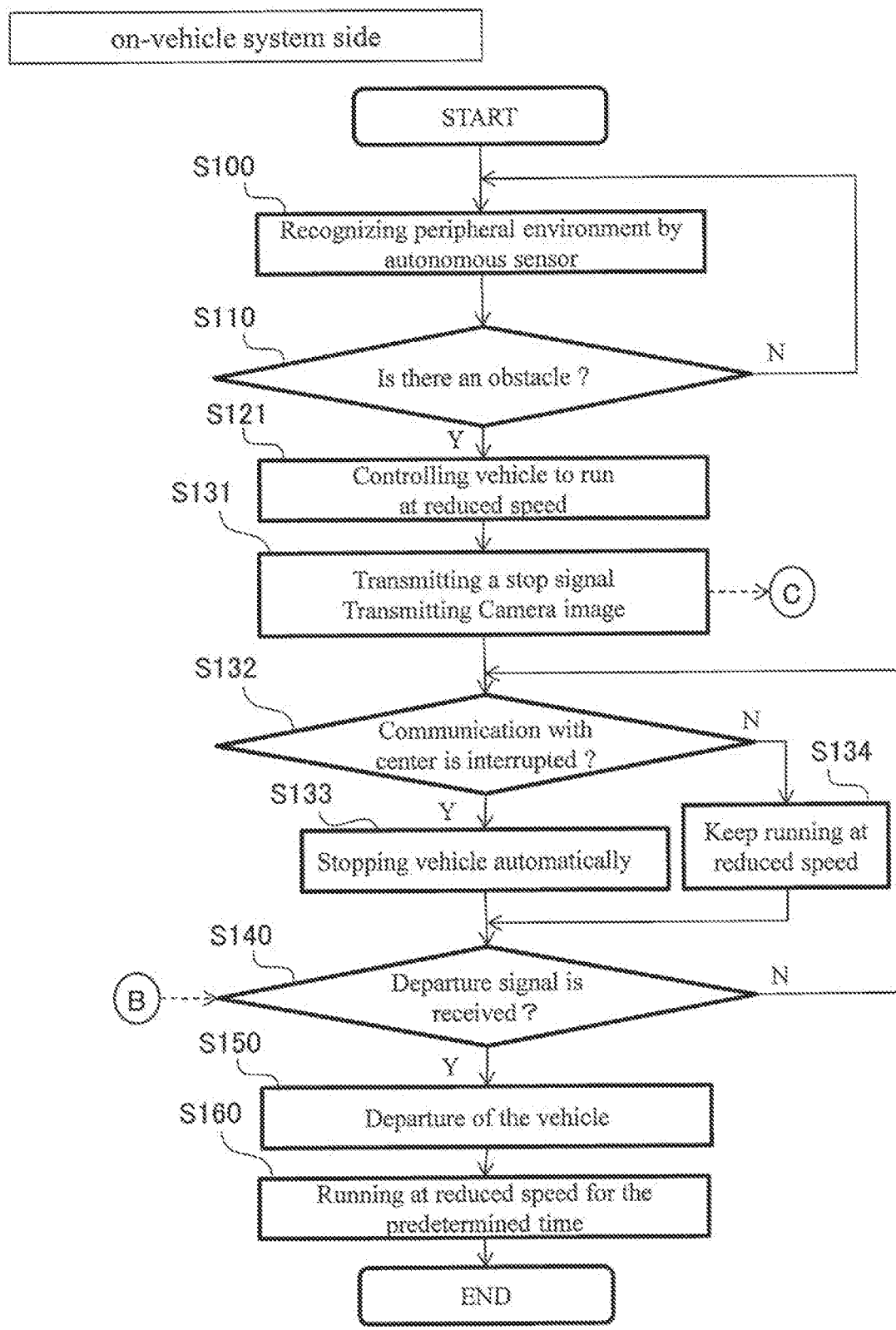
FIG. 4 is a flow chart which shows processing on on-vehicle system side for realizing remote monitoring method of 2nd embodiment.
Figure 5:
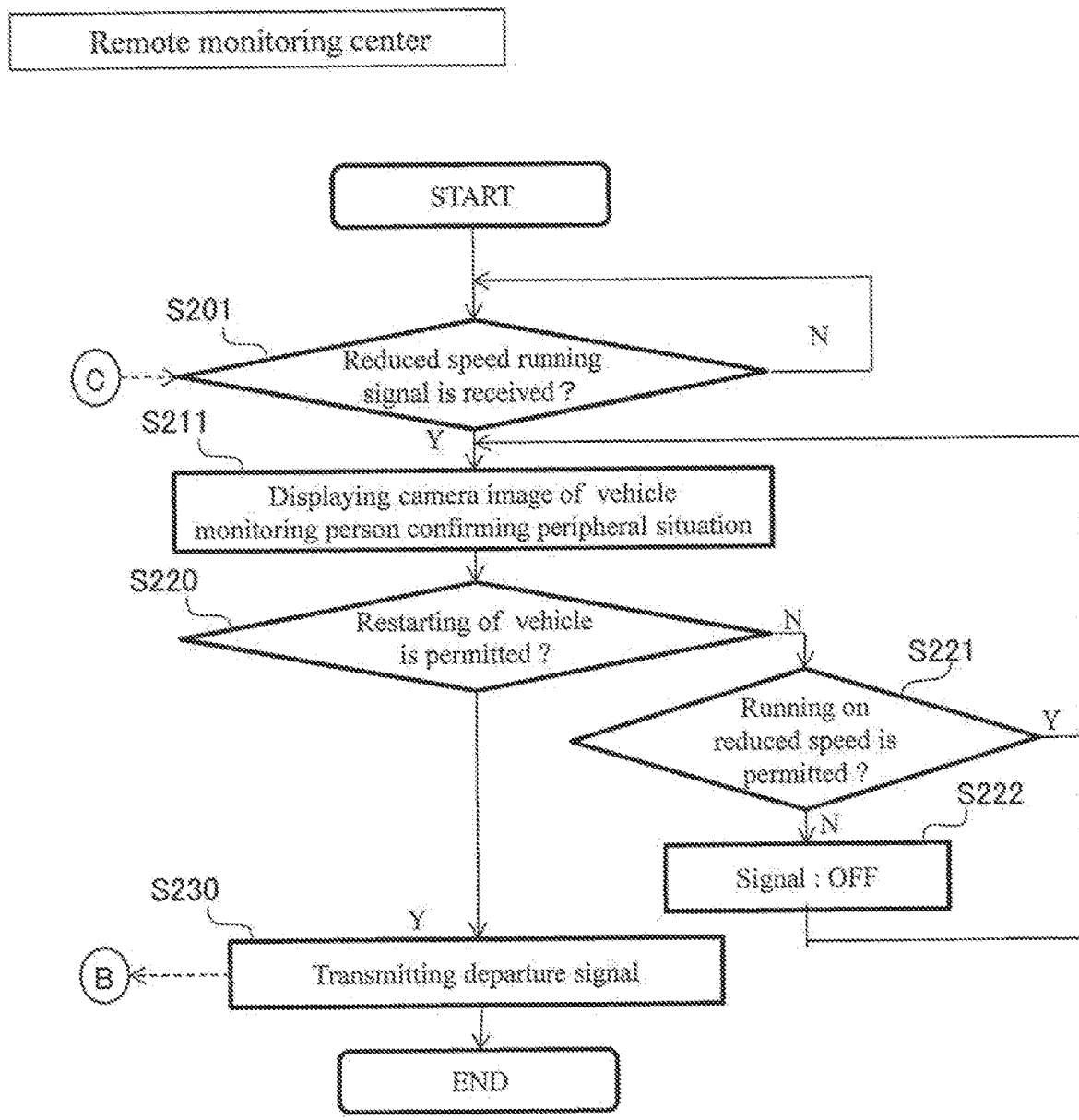
FIG. 5 is a flow chart which shows processing on remote monitoring center side for realizing the remote monitoring method of 2nd embodiment.

Remote monitoring method according to the 2nd embodiment which can be performed in the remote monitoring system 1 will be described as follows:

FIG. 4 is a flow chart which shows processing on the on-vehicle system side for realizing the remote monitoring method of 2nd embodiment. FIG. 5 is a flow chart which shows processing on the remote monitoring center side for realizing the remote monitoring method of 2nd embodiment. Note that explanation about the processing in each of the flow charts same as the remote monitoring method of 1st embodiment is simplified or omitted.

At first, processing on the on-vehicle system side is described with reference to FIG. 4. According to the flow chart shown in FIG. 4, when an obstacle having a risk of collision is detected in step S110, the stop control 26 unit does not make the vehicle 10 automatically stop suddenly but makes the vehicle 10 go slowly at extremely low speed (e.g., 5 to 6 [km/h]) (step S121). When the vehicle 10 is completely stopped, an occupant may feel it uncomfortable. However, if it is slow driving but not a stop, the uncomfortable feeling of the occupant can be suppressed.

When the stop control unit 26 makes the vehicle 10 go slowly, the stop control unit 26 transmits a stop signal to the remote monitoring center 4 and the camera image transmitter section 22 transmits camera image, which is an image around the vehicle 10 photographed by the camera 12, to remote monitoring center 4 (step S131). The transmission of the camera image is carried out at a certain period according to a communication cycle between the remote monitoring center 4 and the communication unit 18.

The stop control unit 26 determines whether or not the communication with the remote monitoring center 4 is interrupted (step S132). For example, the stop control unit 26 determines that the interruption of the communication occurs when the signal which should be transmitted from the remote monitoring center 4 is not received even if a time-out period elapses. While the communication with the remote monitoring center 4 is established, the stop control unit 26 keeps the vehicle 10 running at the reduced speed (step S134). However, the stop control unit 26 makes the vehicle 10 automatically stop when the communication with the remote monitoring center 4 is interrupted (step S133).

Deterioration of the communication environment, increase in the line load, and the like, cause the interruption of the communication with the vehicle 10. Also, the remote monitoring center 4 can actively decide to interrupt the communication. In the remote monitoring center 4, a monitoring person monitors the camera image displayed by the display. In 2nd embodiment, when the monitoring person determines there is a risk of collision with the obstacle based on the camera image, the monitoring person operates the HMI so as to actively interrupt the communication. Thereby, the vehicle 10 can be stopped immediately when the monitoring person determines that there is the risk or that the risk is increased whereas the vehicle 10 can run at the reduced speed when the monitoring person determines that the risk is low. Also, the vehicle 10 can be automatically stopped when the monitoring person becomes unable to monitor the camera image by the interruption of the communication.

When the communication with the remote monitoring center 4 is re-established after automatically stop of the vehicle 10, the stop control unit 26 makes the vehicle 10 go slowly (step S134). Even when the communication with the remote monitoring center 4 has been interrupted for a long time, the stop control unit 26 maintains the vehicle 10 in a stop state so as to give first priority to safety (step S133). This control is carried out regardless of a place. However, if the vehicle 10 is stopping in the intersection, inconvenience is larger. Thus, in the autonomous running control when the vehicle 10 enters the intersection, the control without the need to stop the vehicle 10 in the intersection is performed as much as possible. More specifically, for example, after confirmed that there are not preceding vehicles likely to be left behind in an intersection, the vehicle 10 enters the intersection.

After a signal of reduced speed running was transmitted to the remote monitoring center 4, the restart control unit 28 determines whether or not a departure signal from the remote monitoring center 4 is received (step S140). The vehicle 10 is kept in a state of running at reduced speed or in a state of stopping until a departure signal is received. When receiving a departure signal from the remote monitoring center 4, the restart control unit 28 performs the processing for departure of the vehicle 10 (step S150), and makes the vehicle 10 run at reduced speed for the predetermined time after the departure (step S160).

The processing on the remote monitoring center side will be described with reference to FIG. 5. According to the flow chart shown in FIG. 5, the remote monitoring center 4 determines whether or not the stop signal from the vehicle 10 was received (step S201). The remote monitoring center 4 is in the standby state until the signal of reduced speed running is received.

When the signal of reduced speed running from vehicle 10 is received, the camera image which is transmitted from the vehicle 10 running at reduced speed is displayed on the display. The monitoring person views the camera image displayed on the display to confirm the peripheral situation of the vehicle 10 (step S211). Based on the confirmation result on the display, the monitoring person determines whether or not restarting of the vehicle 10 is permitted in the situation (step S220).

When the restart of running is unable, the monitoring person determines whether or not it is permitted to keep the vehicle 10 running at reduced speed (step S221). A signal is sent from the remote monitoring center 4 to the vehicle 10 at a certain period. Because this signal continues to be sent if nothing is done, the vehicle 10 keeps running at reduced speed unless the communication is interrupted by an external factor. The monitoring person turns off a signal so that the communication between the remote monitoring center 4 and the vehicle 10 is interrupted when determined that it is necessary to stop the vehicle 10 (step S222). Thereby, the vehicle 10 which is running at reduced speed stops automatically.

The processing from step S210 to step S221 or the processing from step S210 to step S222 are repeated until safety is confirmed and then the restarting the vehicle 10 is enabled. When determining that the restarting of the vehicle 10 is permitted, the monitoring person operates the HMI so that a departure signal is transmitted from the computer of the remote monitoring center 4 to the vehicle 10 (step S230).

According to the remote monitoring method of the 2nd embodiment performed in the above-mentioned procedure, the similar effect as in the remote monitoring method of 1st embodiment can be obtained. Furthermore, according to the remote monitoring method of 2nd embodiment, the uncomfortable feeling of occupants can be suppressed by the reduced speed running while the communication is established between the vehicle 10 and the remote monitoring center 4. The vehicle 10 can be immediately stopped by a determination of the remote monitoring center 4 when any problem occurs in the reduced speed running of the vehicle 10. Safety can be secured by automatic stop of the vehicle 10 when the communication between the vehicle 10 and the remote monitoring center 4 is interrupted.

3rd Embodiment

Figure 6:
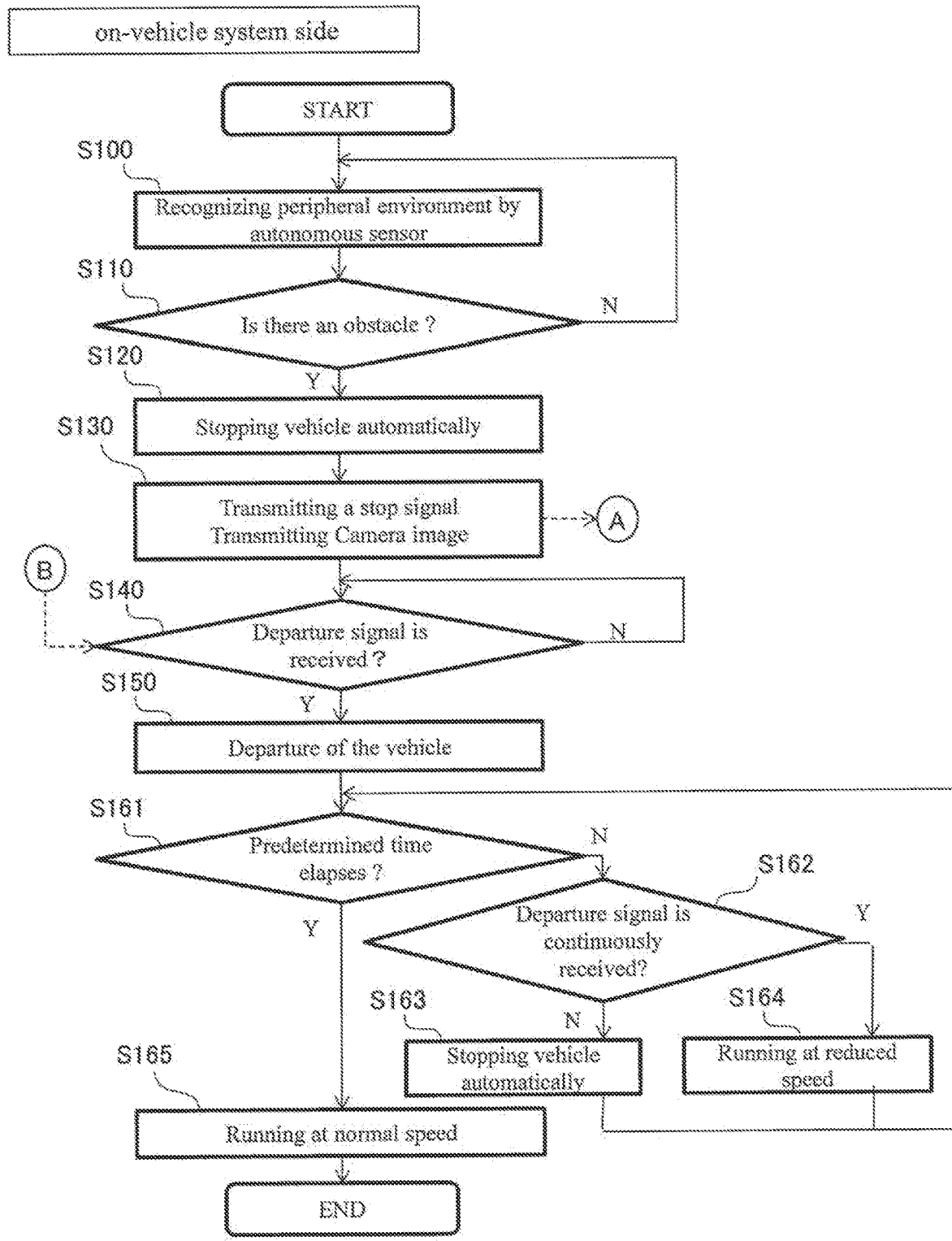
FIG. 6 is a flow chart which shows processing on on-vehicle system side for realizing remote monitoring method of 3rd embodiment.
Figure 7:
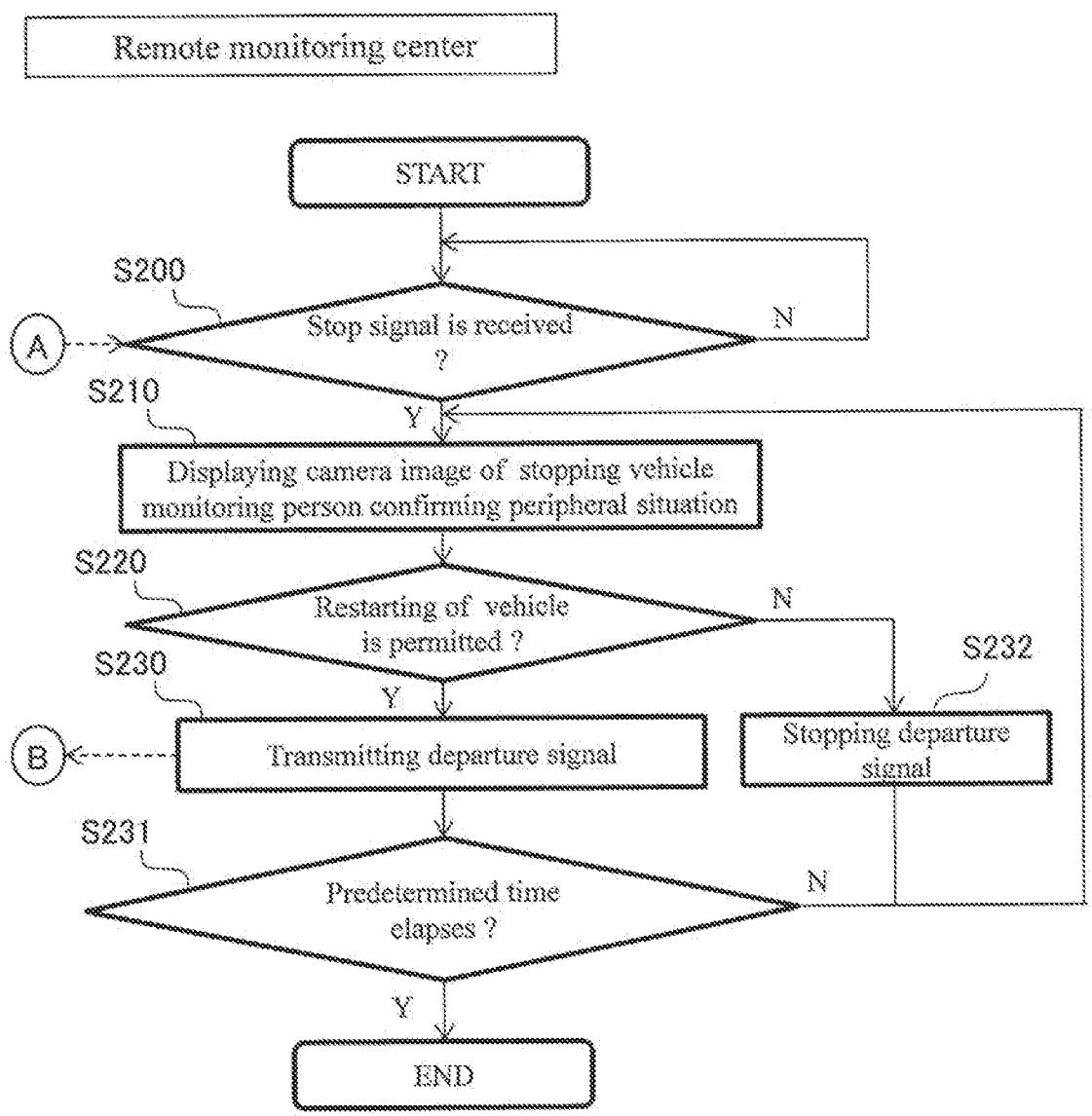
FIG. 7 is a flow chart which shows processing on remote monitoring center side for realizing the remote monitoring method of 3rd embodiment.

Then, a remote monitoring method of 3rd embodiment that can be performed in the remote monitoring system 1 will be described. FIG. 6 is a flow chart which shows processing on the on-vehicle system side for realizing the remote monitoring method of 3rd embodiment. FIG. 7 is a flow chart which shows processing on the remote monitoring center side for realizing the remote monitoring method of 3 embodiment. Note that explanation about the same processing as the remote monitoring method of 1st embodiment in each of the flow charts is simplified or omitted.

At first, processing on the on-vehicle system side is described with reference to FIG. 6. According to the flow chart shown in FIG. 6, when a departure signal from the remote monitoring center 4 is received in step S140, the restart control unit 28 performs processing for departure of the vehicle 10 (step S150). It is determined whether or not predetermined time elapses after receiving the first departure signal from the remote monitoring center 4 (step S161). The predetermined time may be changed according to the running environment of the vehicle 10. For example, the predetermined time in the lane for exclusive use of automobiles may be shortened. At the intersection, time required for the vehicle 10 to pass through an intersection at reduced speed may be set as predetermined time in the intersection.

If the predetermined time does not elapse after the reception of the first departure signal, the restart control unit 28 determines whether or not a departure signal is continuously received (step S162). When the departure signal is continuously received, that is, when the departure signal is not stopped, the restart control unit 28 makes the vehicle 10 run at reduced speed (step S164). The restart control unit 28 automatically stops the vehicle 10 when the departure signal is not received (step S163).

The processing from step S161 to S163 or the processing from step S161 to step S164 is repeated until the predetermined time elapses after the reception of the first departure signal. The restart control unit 28 makes the vehicle 10 run at the normal speed along the predetermined speed plan after the predetermined time elapses from the reception of the first departure signal (step S165).

The processing on the remote monitoring center side will be described with reference to FIG. 7. According to the flow chart shown in FIG. 7, after transmitting the departure signal in step S230, the remote monitoring center 4 determines whether or not the predetermined time elapses from the transmission of the first departure signal (step S231). The processing and determination from step S210 to step S231 are repeated until the predetermined time elapses from the transmission of the first departure signal. However, in the middle of the repetition of the processing, the remote monitoring center 4 stops transmitting the departure signal when determined the restarting of the vehicle 10 cannot be permitted in step S220 (step S232). And then, the remote monitoring center 4 finishes the processing according to this flow chart when the predetermined time passes elapses from the first departure signal.

According to the remote monitoring method of the 3rd embodiment performed in the above-mentioned procedure, the similar effect as that of the remote monitoring method of 1st embodiment can be obtained. Furthermore, according to the remote monitoring method of 3rd embodiment, until the predetermined time elapses after restarting of the run, the vehicle 10 stops if the input of the departure signal from the remote monitoring center 4 is interrupted. Therefore, it can ensure the safety in the situation in which the remote surveillance of the remote monitoring center 4 does not function. Also, according to the remote monitoring method of 3rd embodiment, the vehicle 10 can be immediately stopped by an interruption of transmission of the departure signal from the remote monitoring center 4. The remote monitoring method of the 3rd embodiment is suitable for use in remote surveillance in the running environment where scrupulous attention is demanded after restarting of a run. More specifically, the remote monitoring method is suitable for use in remote surveillance of the vehicle 10 at an intersection, especially at an intersection without a signal.

4th Embodiment

Figure 8:
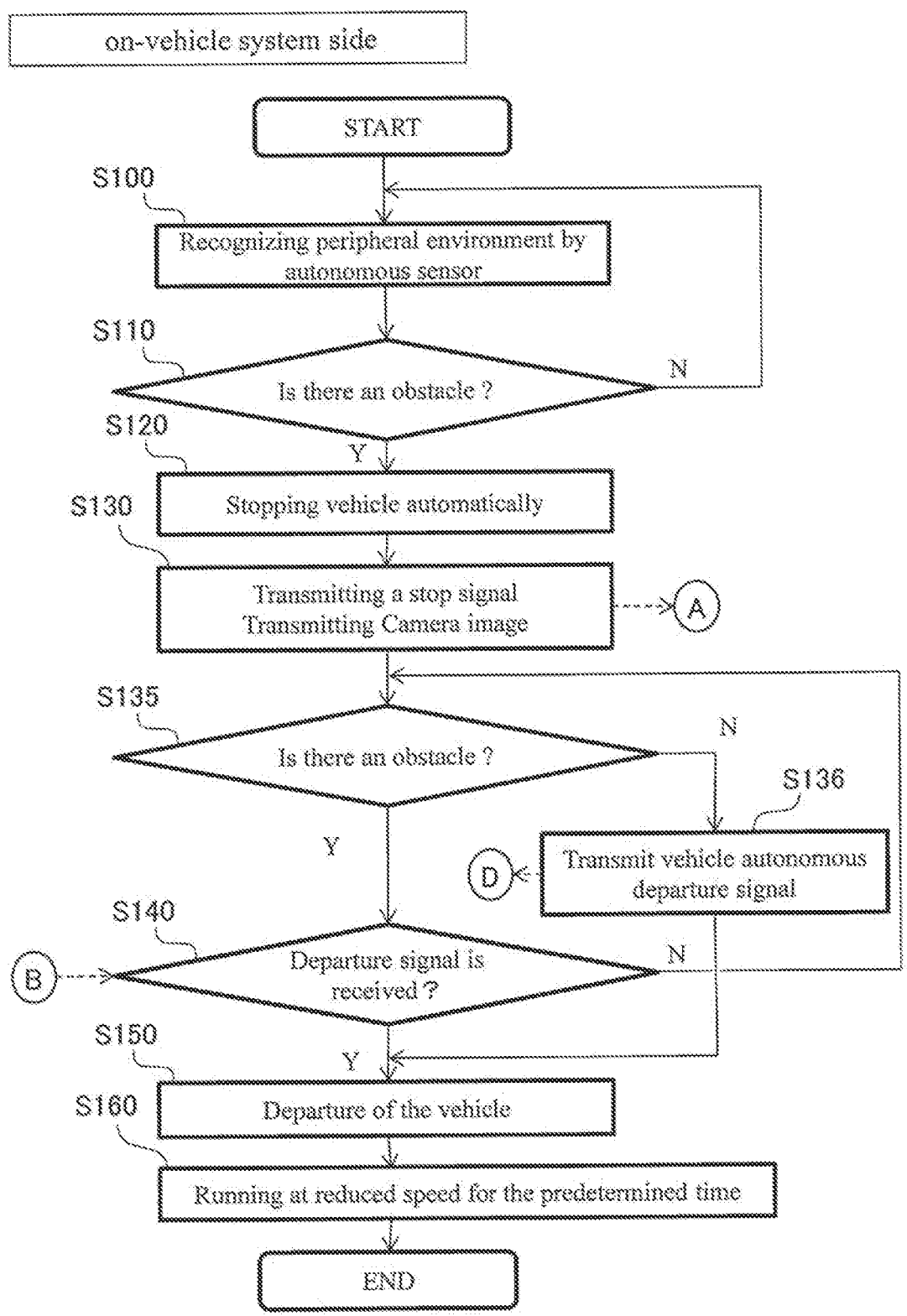
FIG. 8 is a flow chart which shows processing on on-vehicle system side for realizing remote monitoring method of 4th embodiment.
Figure 9:
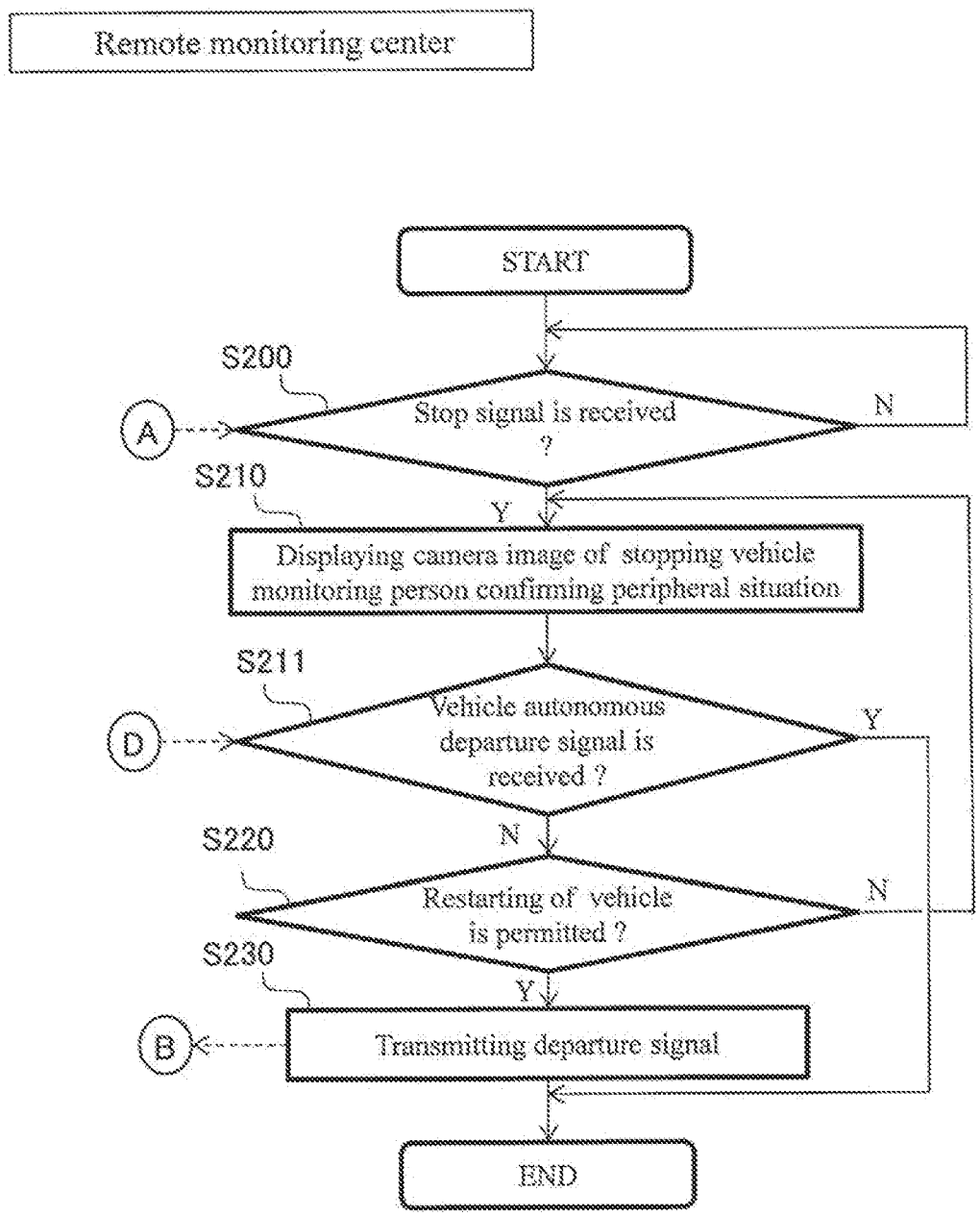
FIG. 9 is a flow chart which shows processing on remote monitoring center side for realizing the remote monitoring method of 4th embodiment.

Then, a remote monitoring method of 4th embodiment that can be performed in the remote monitoring system 1 will be described. FIG. 8 is a flow chart which shows processing on the on-vehicle system side for realizing the remote monitoring method of 4th embodiment. FIG. 9 is a flow chart which shows processing on the remote monitoring center side for realizing the remote monitoring method of 4th embodiment. Note that explanation about the same processing as the remote monitoring method of 1st embodiment in each of the flow charts is simplified or omitted.

At first, processing on the on-vehicle system side is described with reference to FIG. 8. According to the flow chart shown in FIG. 8, after the stop signal is transmitted to the remote monitoring center 4 in step S130, the obstacle detection part 24 determines again whether or not there is an obstacle having a risk of collision around the vehicle 10 (step S135). This determination is carried out repeatedly until a departure signal from the remote monitoring center 4 is received in step S140. Since the detection accuracy of the autonomous sensor 12, 14 and 16 depends on the vehicle speed, when the vehicle 10 is stopped, an obstacle can be detected with higher accuracy than the detection accuracy in the determination in step S110.

When the obstacle detection part 24 determines that there is not an obstacle having a risk of collision around the vehicle 10, the restart control unit 28 transmits a vehicle autonomous departure signal to the remote monitoring center 4. The restart control unit 28 autonomously performs departure processing of the vehicle 10 without waiting for the reception of a departure signal from the remote monitoring center 4 (step S150). If the restart control unit 28 waits for the departure signal from the remote monitoring center 4 when communication between the vehicle 10 and the remote monitoring center 4 is interrupted, the vehicle 10 takes forever to restart. Since the vehicle 10 autonomously is restarted when safety can be confirmed on the vehicle 10 side, it is possible to prevent a situation where the vehicle cannot be restarted even after any time. In case of the autonomously restarting by the determination on the vehicle 10 side, the vehicle 10 runs at reduced speed for the predetermined time after the departure (step S160).

The processing on the remote monitoring center side will be described with reference to FIG. 9. According to the flow chart shown in FIG. 9, while the processing of step S210 and the determination of step S220 are repeated because of being unable to determine restarting the vehicle 10, the remote monitoring center 4 determines whether or not the vehicle autonomous departure signal is received (step S211). The remote monitoring center 4 skips the remaining steps so as to finish the processing in this flow chart when receiving the vehicle autonomous departure signal.

According to the remote monitoring method of 4th embodiment performed in the above-mentioned procedure, the similar effect as in the remote monitoring method of 1st embodiment can be obtained. Furthermore, according to the remote monitoring method of 4th embodiment, a run of the vehicle 10 can be restarted when safety is confirmed on the vehicle 10 side even if the communication between the vehicle 10 and the remote monitoring center 4 is interrupted.

5th Embodiment

Figure 10:
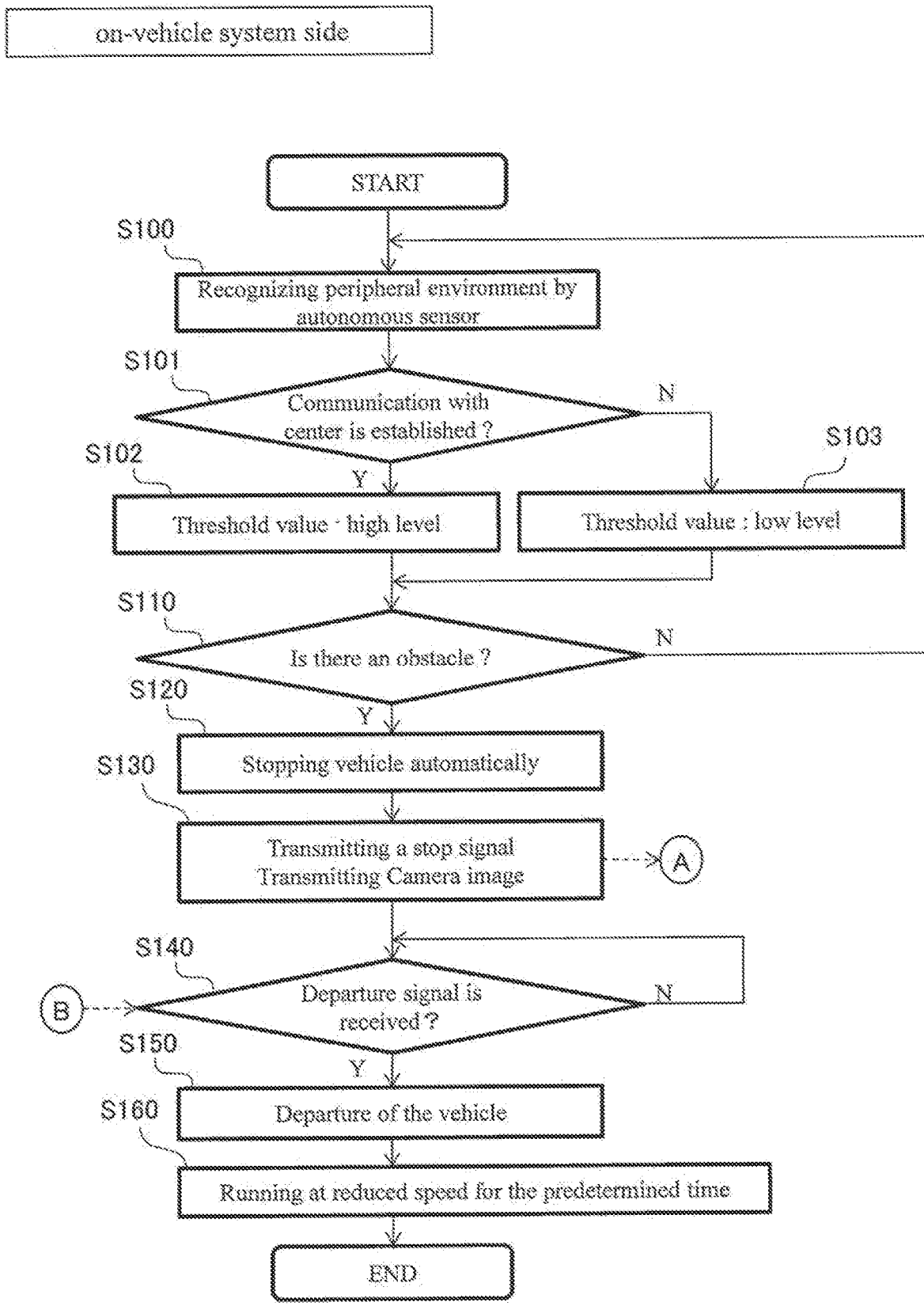
FIG. 10 is a flow chart which shows processing on on-vehicle system side for realizing remote monitoring method of 5th embodiment.

Then, a remote monitoring method of 5th embodiment that can be performed in the remote monitoring system 1 will be described. The remote monitoring method of 5th embodiment is characterized in processing on the on-vehicle system side. The explanation of the processing on the remote monitoring center side is omitted because the processing is the same as the processing of the remote monitoring center side in 1st embodiment (cf. FIG. 3). FIG. 10 is a flow chart which shows the processing on the on-vehicle system side for realizing the remote monitoring method of 5th embodiment. Hereinafter, the processing on the on-vehicle system side will be described with reference to FIG. 10. However, explanation about the same processing as the processing on the on-vehicle system side of 1st embodiment in each of the flow charts is simplified or omitted.

According to the flow chart shown in FIG. 10, after the recognition of the peripheral environment by the autonomous sensor 12, 14 and 16 is performed in step S100, the obstacle detection part 24 determines whether or not the communication with the remote monitoring center 4 is established (step S101). The threshold level of the obstacle detection by the obstacle detection part 24 is variable. If the threshold level is raised, the suspicious one as an obstacle is hardly detected as an obstacle whereas if the threshold level is lowered, the suspicious one as an obstacle is easily detected as an obstacle. Thus, possibility of erroneous detection detecting a noise as an obstacle can be reduced if a threshold level is raised. On the other hand, possibility of non-detection wherein an obstacle is not detected even though it is the obstacle in actuality increases.

Therefore, in this embodiment, the threshold level of the obstacle detection is changed depending on a state of the communication with the remote monitoring center 4. Specifically, when the communication with remote monitoring center 4 is established, the obstacle detection part 24 sets the threshold value of the obstacle detection to the high level which is normal setting (step S102). On the other hand, when the communication with the remote monitoring center 4 is interrupted, the obstacle detection part 24 sets the threshold value of the obstacle detection not to a high level but to a low level (step S103). That is, when the communication with the remote monitoring center 4 is interrupted, the obstacle detection part 24 changes the threshold value of the obstacle detection so as to reduce non-detection whereas permitting erroneous detection compared with the case that the communication with the remote monitoring center 4 is established. And, using the threshold value of the level set in step S102 or step S103, the obstacle detection is performed and it is determined whether or not there is an obstacle having a risk of collision around the vehicle 10 (step S110).

According to the remote monitoring method of 5th embodiment performed in the above-mentioned procedure, the similar effect as in the remote monitoring method of 1st embodiment can be obtained. Furthermore, according to the remote monitoring method of 5th embodiment, since the threshold value of the obstacle detection is changed to low level when the communication between the vehicle 10 and the remote monitoring center 4 is interrupted, the possibility of the "erroneous detection" wherein an obstacle which there cannot be is detected by mistake will increase. However, the possibility of "non-detection" wherein an obstacle which there should be is not detected can be reduced. As a result, according to the remote monitoring method of 5th embodiment, the safety in the situation in which the remote surveillance of the remote monitoring center 4 does not function can be more reliably secured in comparison with the remote monitoring method of 1st embodiment.

6th Embodiment

Figure 11:
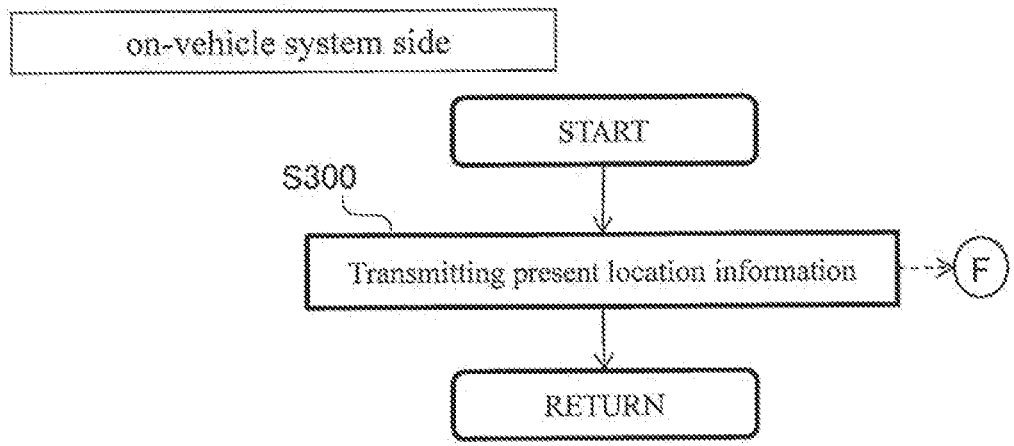
FIG. 11 is a flow chart showing preliminary processing which is constantly performed on on-vehicle system side for realizing remote monitoring method of 6th embodiment.
Figure 12:
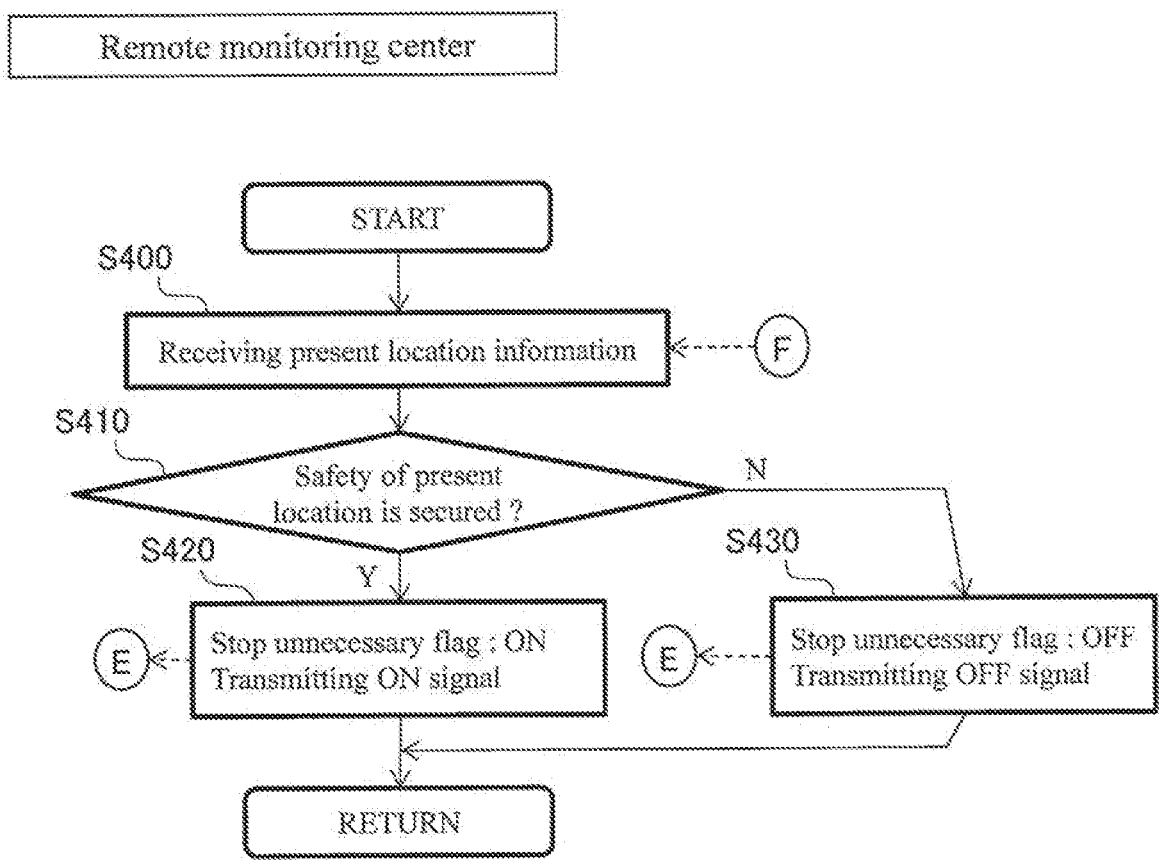
FIG. 12 is a flow chart showing preliminary processing which is constantly preformed on remote monitoring center side for realizing the remote monitoring method of 6th embodiment.

Then, a remote monitoring method of 6th embodiment that can be performed in the remote monitoring system 1 will be described. In 6th embodiment, preliminary processing for remote surveillance is constantly carried out on each side of the on-vehicle system and the remote monitoring center. FIG. 11 is a flow chart which shows preliminary processing constantly performed on the on-vehicle system side for realizing the remote monitoring method of 6th embodiment. FIG. 12 is a flow chart which shows preliminary processing constantly performed on the remote monitoring center side for realizing the remote monitoring method of 6th embodiment.

As shown in FIG. 11, on the on-vehicle system side, present location information, that is location information of the vehicle 10 acquired by GPS, is transmitted to the remote monitoring center 4 (step S300).

As shown in FIG. 12, on the remote monitoring center side, the present location information transmitted by the vehicle 10 is received (step S400). The computer of the remote monitoring center 4 collates the received present location information with data base and determines whether or not the present location of the vehicle 10 is in the place that can secure safety (step S410). Place where the vehicle 10 is automatically stopped in the past and a confirmation result of safety at that place are stored in the database. When it is determined that the present location of the vehicle 10 is in the place that can secure safety, ON signal of a stop unnecessary flag is transmitted from the computer of the remote monitoring center 4 to the vehicle 10 (step S420). On the other hand, when it is determined that the present location is not in the place that can secure safety, OFF signal of the stop unnecessary flag is transmitted from the computer of the remote monitoring center 4 to the vehicle 10 (step S430).

Figure 13:
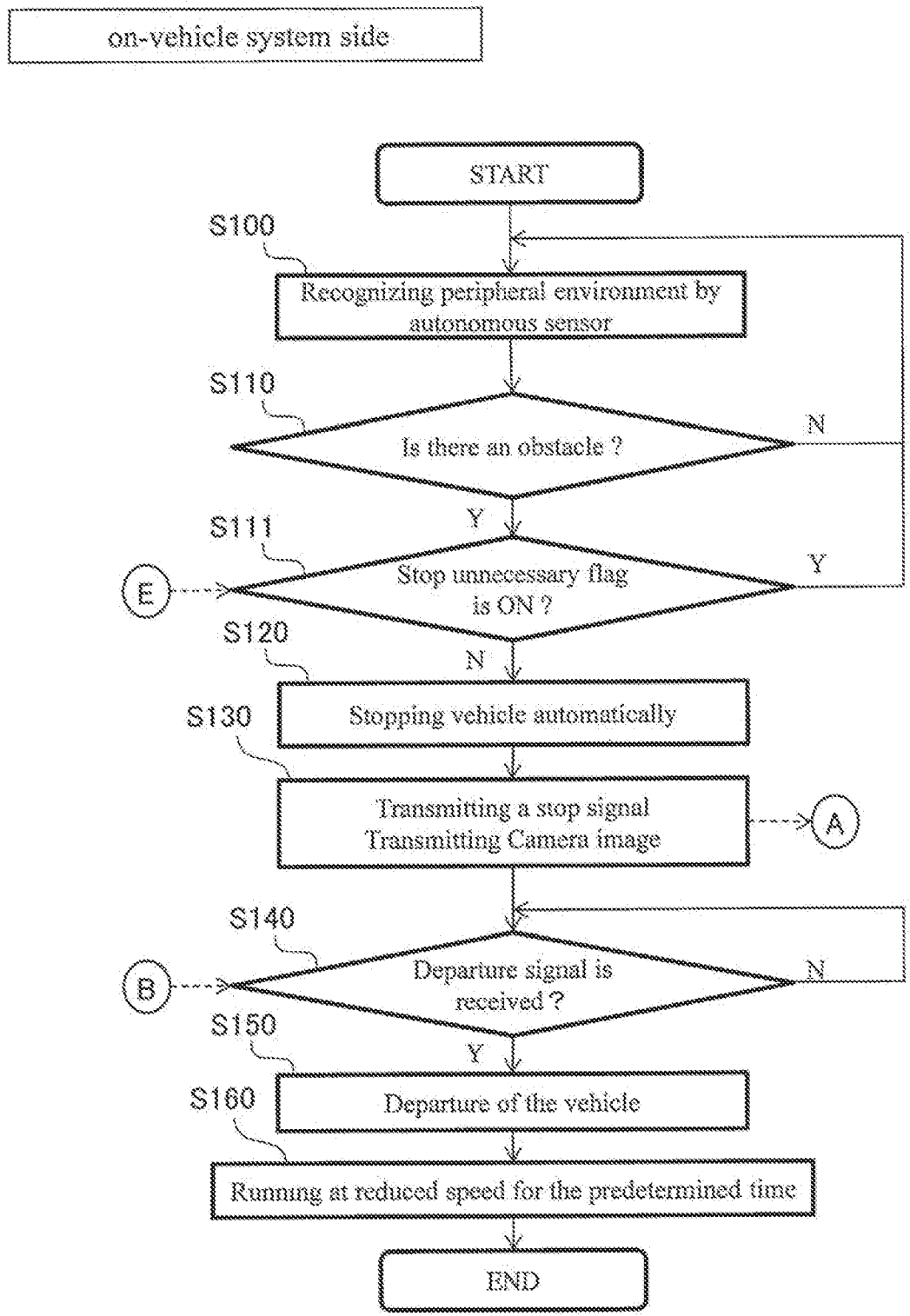
FIG. 13 is a flow chart which shows processing on on-vehicle system side for realizing the remote monitoring method of 6th embodiment.

Then, a remote monitoring method of 6th embodiment based on the above described preliminary processing will be described. The remote monitoring method of 6th embodiment is characterized in processing on the on-vehicle system side. The explanation of the processing on the remote monitoring center side is omitted because the processing is the same as the processing of the remote monitoring center side in 1st embodiment (cf. FIG. 3). FIG. 13 is a flow chart which shows processing on the on-vehicle system side for realizing the remote monitoring method of 6th embodiment. Hereinafter, the processing on the on-vehicle system side will be described with reference to FIG. 13. However, explanation about the same processing as the processing on the on-vehicle system side of 1st embodiment in each of the flow charts is simplified or omitted.

According to the flow chart shown in FIG. 13, when it is determined that there is an obstacle having a risk of collision around the vehicle 10 in step S110, the stop control unit 26 determines whether or not the ON signal of the stop unnecessary flag is received (step S111). When the ON signal of the stop unnecessary flag is not received, that is, when the present location of the vehicle 10 is in the place of which safety is not notified by the remote monitoring center 4, the stop control unit 26 makes the vehicle 10 automatically stopped just before the obstacle (step S120). When the ON signal of the stop unnecessary flag is received, that is, when the present location of the vehicle 10 is in the place of which safety is notified by the remote monitoring center 4, the detection of the obstacle by the obstacle detection part 24 is likely to be an erroneous detection. Therefore, the stop control unit 26 continues the vehicle 10 running without being stopped. In this case, according to the flow chat, the processing of step S100 and the determination of step S110 and S111 are repeated until the result of the determination of S111 becomes negative.

According to the remote monitoring method of 6th embodiment performed in the above-mentioned procedure, the similar effect as in the remote monitoring method of 1st embodiment can be obtained. Furthermore, according to the remote monitoring method of 6th embodiment, in the place where the remote monitoring center 4 determines to be safety, the vehicle 10 does not automatically stop even when detecting an obstacle by autonomy detection of the vehicle 10. Therefore, the frequency of inessential stop of the vehicle 10 due to the erroneous detection of the obstacle can be reduced.

Other Embodiments

In the above-mentioned embodiments, the camera image is transmitted to the remote monitoring center 4 after an obstacle having a risk of collision is detected. However, camera image may be constantly transmitted to the remote monitoring center 4 during running of the vehicle 10.

An Example

Figure 14:
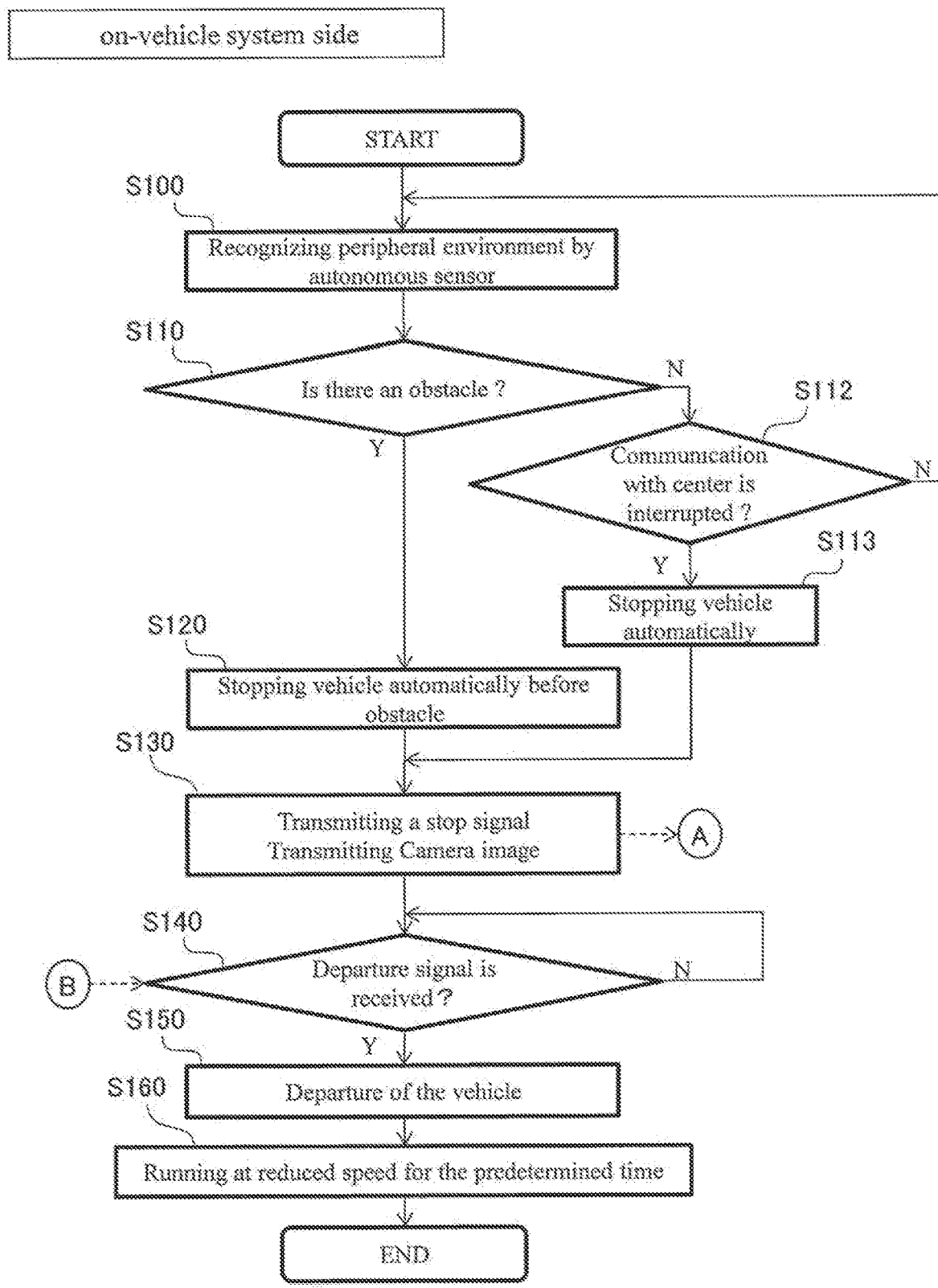
FIG. 14 is a flow chart which shows processing on on-vehicle system side for realizing remote monitoring method of reference example.

Then, a remote monitoring method of the example that can be performed in the remote monitoring system 1 will be described. The remote monitoring method of the example is characterized in processing on the on-vehicle system side. The explanation of the processing on the remote monitoring center side is omitted because the processing is the same as the processing of the remote monitoring center side in 1st embodiment (cf. FIG. 3). FIG. 14 is a flow chart which shows processing on the on-vehicle system side for realizing the remote monitoring method of the example. Hereinafter, the processing on the on-vehicle system side will be described with reference to FIG. 14. However, explanation about the processing in the flow chart of FIC. 14 same as the processing on the on-vehicle system side of 1st embodiment is simplified or omitted.

According to the flow chart shown in FIG. 14, when it is determined that there is not an obstacle having a risk of collision around the vehicle 10 in step S110, the stop control unit 26 determines whether or not the communication with the remote monitoring center 4 is interrupted (step S112). When the communication with the remote monitoring center 4 is established, the processing of step S100 and determinations of steps S110 and S112 are repeated while the running of the vehicle 10 is continued.

However, the stop control unit 26 makes the vehicle 10 automatically stop when the communication with the remote monitoring center 4 is interrupted (step S113). The stop control unit 26 transmits a stop signal to the remote monitoring center 4. The camera image transmitter section 22 transmits camera image, which is an image around the vehicle 4 photographed by the camera 12, to remote monitoring center 4 (step S130).

After the stop signal was transmitted to the remote monitoring center 4, the restart control unit 28 determines whether or not a departure signal from the remote monitoring center 4 was received (step S140). The vehicle 10 remains stopped until the departure signal is received. When receiving the departure signal from the remote monitoring center 4, the restart control unit 28 performs the processing for departure of the vehicle 10 (step S150), and makes the vehicle 10 run at reduced speed for the predetermined time after the departure (step S160).

According to the remote monitoring method of the example performed in the above-mentioned procedure, the similar effect as in the remote monitoring method of 1st embodiment can be obtained. Furthermore, according to the remote monitoring method of the example, if the communication between the vehicle 10 and the remote monitoring center 4 is interrupted, the vehicle 10 automatically stops. Therefore, it can ensure the safety in the situation in which the remote surveillance of the remote monitoring center 4 does not function.

Note that the other aspect of the preferred embodiments may be lead from the example as follows:

An autonomous running vehicle, which is connected to the remote monitoring center through a network and can be remotely operated by a remote monitoring center, comprises;
a camera which photographs an environment of the autonomous running vehicle;
a camera image transmitter section which transmits an image around the autonomous running vehicle photographed by the camera to the remote monitoring center;
a stop control unit which makes the autonomous running vehicle automatically stop when the communication between the autonomous running vehicle and the remote monitoring center is interrupted; and
a travel restart control unit which restarts a run of the autonomous running vehicle when receiving a departure signal from the remote monitoring center after automatic stop the autonomous running vehicle by the stop control unit.

What is claimed is:

1. A remote monitoring system comprising:
a vehicle which is configured to autonomously run; and
a center which is configured to communicate with the vehicle, wherein
the vehicle comprises:
an autonomous sensor obtaining a peripheral environment of the vehicle;
a data transmitter section configured to transmit data obtained by the autonomous sensor to the center;
an obstacle detection part configured to detect an obstacle in front of a course of the vehicle based on information obtained by the autonomous sensor;
a stop control unit configured to stop the vehicle based on detection of an obstacle by the obstacle detection part and to transmit a first signal to the center; and
a restart control unit configured to, when a second signal for permitting to restart running of the vehicle from the center is received after the vehicle is stopped by the stop control unit, restart the running of the vehicle; wherein
the center comprises:
a display displaying an image around the vehicle based on the data from the data transmitter section when the center received the first signal from the stop control unit; and
a human machine interface receiving an input of an instruction to permit to restart the running of the vehicle, and
the center is configured to transmit the second signal to the vehicle when the human machine interface receives the input of the instruction to permit the restarting the running of the vehicle, wherein
the center is further configured to, when a present location of the vehicle is in a predetermined place of which safety is confirmed by the center based on a previous confirmation result of safety at the predetermined place, transmit a third signal for indicating a stop of the vehicle is unnecessary to the vehicle, and wherein
the stop control unit is further configured to, after receiving the third signal, prevent the vehicle from being stopped even when the obstacle detection part detects an obstacle.

2. The remote monitoring system according to claim 1, wherein the stop control unit is configured to:
run the vehicle at reduced speed based on detection of an obstacle by the obstacle detection part; and
stop the vehicle when the communication with the center is interrupted.

3. The remote monitoring system according to claim 1, wherein the restart control unit is configured to keep the vehicle running at reduced speed for a predetermined time after restarting the running of the vehicle.

4. The remote monitoring system according to claim 1, wherein the restart control unit is configured to:
run the vehicle at reduced speed while the second signal is received from the center, and
stop the vehicle when the second signal from the center is interrupted.

5. The remote monitoring system according to claim 1, wherein the restart control unit is configured to restart the running of the vehicle, when the obstacle is not detected by the obstacle detection part after the vehicle is stopped by the stop control unit.

6. The remote monitoring system according to claim 1, wherein the obstacle detection part is configured to, when communication with the center is interrupted, change a threshold value of obstacle detection so as to reduce non-detection and to permit erroneous detection compared with the case that communication with the center is established.

7. A vehicle control device which is configured to communicate with a center and makes a vehicle autonomously run, the vehicle control device comprising:
an autonomous sensor configured to obtain a peripheral environment of the vehicle;
a data transmitter section configured to transmit data obtained by the autonomous sensor to the center;
an obstacle detection part configured to detect an obstacle in front of a course of the vehicle based on information obtained by the autonomous sensor;
a stop control unit configured to stop the vehicle based on detection of an obstacle by the obstacle detection part and to transmit a first signal to the center; and
a restart control unit configured to, when a second signal for permitting to restart running of the vehicle from the center is received after the vehicle is stopped by the stop control unit, restart the running of the vehicle, wherein
the stop control unit is configured to, after receiving a third signal for indicating that a present location of the vehicle is in a predetermined place of which safety is confirmed by the center based on a previous confirmation result of safety at the predetermined place, prevent the vehicle from being stopped even when the obstacle detection part detects an obstacle.

8. The vehicle control device according to claim 7, wherein the stop control unit is configured:
based on detection of an obstacle, to run the vehicle at reduced speed; and
when the communication with the center is interrupted, to stop the vehicle.

9. The vehicle control device according to claim 7, wherein the restart control unit is configured to keep the vehicle running at reduced speed for a predetermined time after restarting the running of the vehicle.

10. The vehicle control device according to claim 7, wherein the restart control unit is configured to:
run the vehicle at reduced speed while the second signal is received from the center, and
stop the vehicle when the second signal from the center is interrupted.

11. The vehicle control device according to claim 7, wherein the restart control unit is configured to restart the running of the vehicle, when the obstacle is not detected by the obstacle detection part after the vehicle is stopped by the stop control unit.

12. The vehicle control device according to claim 7, wherein the obstacle detection part is configured to, when communication with the center is interrupted, change a threshold value of obstacle detection so as to reduce non-detection whereas to permit erroneous detection compared with the case that communication with the center is established.

13. A remote monitoring method for controlling an autonomous running of a vehicle, the remote monitoring method comprising:
by an in-vehicle computer of the vehicle,
transmitting data obtained by an autonomous sensor to a computer of a center;
detecting an obstacle in front of a course of the vehicle based on information obtained by the autonomous sensor;
stopping the vehicle based on detection of an obstacle and transmitting a first signal to the center; and
restarting running of the vehicle when a second signal for permitting to restart the running of the vehicle from the computer of the center is received; and
by a computer of the center,
when receiving the first signal, displaying an image around the vehicle based on the data from the in-vehicle computer; and
receiving an input of an instruction to permit to restart the running of the vehicle and transmitting to the in-vehicle computer the second signal, and
when a present location of the vehicle is in a predetermined place of which safety is confirmed by the center based on a previous confirmation result of safety at the predetermined place, transmitting a third signal for indicating that a stop of the vehicle is unnecessary to the vehicle, wherein
after receiving the third signal, the vehicle is not stopped and the first signal is not transmitted even when the obstacle detection part detects an obstacle.

14. The remote monitoring method according to claim 13, further comprising:
by the in-vehicle computer,
when an obstacle is detected, running the vehicle at reduced speed, and
stopping the vehicle when the communication between the in-vehicle computer and the computer of the center is interrupted.

15. The remote monitoring method according to claim 13, wherein, when restarting the running of the vehicle, the vehicle runs at reduced speed for a predetermined time after restarting the running of the vehicle.

16. The remote monitoring method according to claim 13, further comprising:
by the in-vehicle computer, when restarting the running of the vehicle,
running the vehicle at reduced speed only while the second signal from the center is received, and
stopping the vehicle when the second signal from the center is interrupted.

17. The remote monitoring method of claim 13, further comprising:
by the in-vehicle computer, when restarting the running of the vehicle,
when the obstacle is not detected after the vehicle is stopped based on the detection of the obstacle, restarting the running of the vehicle.

18. The remote monitoring method of claim 13, further comprising:
by the in-vehicle computer,
when the communication with the center is interrupted, changing a threshold value of obstacle detection so as to reduce non-detection and to permit erroneous detection compared with the case that the communication with the center is established.

19. A control method for controlling autonomous running of a vehicle, the control method comprising:
by an in-vehicle computer of the vehicle,
transmitting data obtained by an autonomous sensor of the vehicle to a computer of a center;
detecting an obstacle in front of a course of the vehicle based on information obtained by the autonomous sensor;

stopping the vehicle based on detection of an obstacle and transmitting a first signal to the center, and restarting running of the vehicle after a second signal for permitting to restart the running of the vehicle from the computer of the remote monitoring center is received, wherein after receiving a third signal for indicating that the present location of the vehicle is in a predetermined place of which safety is confirmed by the center based on a previous confirmation result of safety at the predetermined place, the vehicle is not stopped and the first signal is not transmitted even when the obstacle detection part detects an obstacle.

\* \* \* \* \*